United States Patent
Chen et al.

(10) Patent No.: US 9,602,802 B2
(45) Date of Patent: *Mar. 21, 2017

(54) PROVIDING FRAME PACKING TYPE INFORMATION FOR VIDEO CODING

(71) Applicant: QUALCOMM Incorporated, San Diego, CA (US)

(72) Inventors: Ying Chen, San Diego, CA (US); Marta Karczewicz, San Diego, CA (US); Yong Wang, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 597 days.

This patent is subject to a terminal disclaimer.

(21) Appl. No.: 14/019,944

(22) Filed: Sep. 6, 2013

(65) Prior Publication Data

US 2014/0009578 A1   Jan. 9, 2014

Related U.S. Application Data

(62) Division of application No. 13/082,051, filed on Apr. 7, 2011.
(Continued)

(51) Int. Cl.
*H04N 7/12* (2006.01)
*H04N 13/00* (2006.01)
(Continued)

(52) U.S. Cl.
CPC ....... *H04N 13/0048* (2013.01); *H04N 19/597* (2014.11); *H04N 19/61* (2014.11);
(Continued)

(58) Field of Classification Search
CPC ........... H04N 13/0066; H04N 13/0059; H04N 19/70; G06F 17/3024
See application file for complete search history.

(56) References Cited

U.S. PATENT DOCUMENTS 3,909,721 A   9/1975 Bussgang et al.
4,365,338 A   12/1982 McRae et al.
(Continued)

FOREIGN PATENT DOCUMENTS

CN   1338839 A   3/2002
CN   1425228 A   6/2003
(Continued)

OTHER PUBLICATIONS

Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.
(Continued)

*Primary Examiner* — Zhubing Ren
(74) *Attorney, Agent, or Firm* — Brent Boyd

(57) ABSTRACT

This disclosure includes techniques for signaling characteristics of a representation of multimedia content at a representation layer, such as frame packing arrangement information for the representation. In one example, an apparatus for receiving video data includes a processing unit configured to receive information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determine whether the apparatus is capable of decoding and rendering the bitstream based on an analysis of the received information and decoding and rendering capabilities of the device, and retrieve the bitstream when the processing unit determines that the device is capable of decoding and rendering the bitstream.

26 Claims, 13 Drawing Sheets

Related U.S. Application Data

(60) Provisional application No. 61/366,436, filed on Jul. 21, 2010, provisional application No. 61/433,110, filed on Jan. 14, 2011.

(51) Int. Cl.
| | | |
|---|---|---|
| *H04N 21/81* | (2011.01) | |
| *H04N 21/84* | (2011.01) | |
| *H04N 21/845* | (2011.01) | |
| *H04N 21/854* | (2011.01) | |
| *H04N 19/597* | (2014.01) | |
| *H04N 19/70* | (2014.01) | |
| *H04N 19/61* | (2014.01) | |

(52) U.S. Cl.
CPC .......... *H04N 19/70* (2014.11); *H04N 21/816* (2013.01); *H04N 21/84* (2013.01); *H04N 21/8456* (2013.01); *H04N 21/85406* (2013.01)

(56) References Cited

U.S. PATENT DOCUMENTS

| | | |
|---|---|---|
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,329,369 A | 7/1994 | Willis et al. |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,852,565 A | 12/1998 | Demos |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,144,762 A | 11/2000 | Brooks |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |

(56) References Cited

U.S. PATENT DOCUMENTS

| | | |
|---|---|---|
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,113,773 B2 | 9/2006 | Quick et al. |
| 7,139,660 B2 | 11/2006 | Sarkar et al. |
| 7,139,960 B2 | 11/2006 | Shokrollahi et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi et al. |
| 7,418,651 B2 | 8/2008 | Luby et al. |
| 7,451,377 B2 | 11/2008 | Shokrollahi et al. |
| 7,483,447 B2 | 1/2009 | Chang et al. |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,331,445 B2 | 12/2012 | Garudadri et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,780,998 B2 | 7/2014 | Pandit et al. |
| 8,812,735 B2 | 8/2014 | Igarashi |
| 8,958,375 B2 | 2/2015 | Watson et al. |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0066854 A1 | 4/2004 | Hannuksela |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0231004 A1 | 11/2004 | Seo |
| 2004/0240382 A1 | 12/2004 | Ido et al. |
| 2004/0255328 A1 | 12/2004 | Baldwin et al. |
| 2005/0018635 A1 | 1/2005 | Proctor, Jr. |
| 2005/0028067 A1 | 2/2005 | Weirauch |
| 2005/0041736 A1 | 2/2005 | Butler-Smith et al. |
| 2005/0071491 A1 | 3/2005 | Seo |
| 2005/0091697 A1 | 4/2005 | Tanaka et al. |
| 2005/0097213 A1 | 5/2005 | Barrett et al. |
| 2005/0102371 A1 | 5/2005 | Aksu |
| 2005/0123058 A1 | 6/2005 | Greenbaum et al. |
| 2005/0138286 A1 | 6/2005 | Franklin et al. |
| 2005/0160272 A1 | 7/2005 | Teppler |
| 2005/0163468 A1 | 7/2005 | Takahashi et al. |
| 2005/0169379 A1 | 8/2005 | Shin et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0195899 A1 | 9/2005 | Han |
| 2005/0195900 A1 | 9/2005 | Han |
| 2005/0207392 A1 | 9/2005 | Sivalingham et al. |
| 2005/0216472 A1 | 9/2005 | Leon et al. |
| 2005/0216951 A1 | 9/2005 | MacInnis |
| 2005/0254575 A1 | 11/2005 | Hannuksela et al. |

(56) References Cited

U.S. PATENT DOCUMENTS

| | | |
|---|---|---|
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0193524 A1 | 8/2006 | Tarumoto et al. |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0262856 A1 | 11/2006 | Wu et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0081586 A1 | 4/2007 | Raveendran et al. |
| 2007/0110074 A1 | 5/2007 | Bradley et al. |
| 2007/0127576 A1 | 6/2007 | Henocq et al. |
| 2007/0134005 A1 | 6/2007 | Myong et al. |
| 2007/0140369 A1 | 6/2007 | Limberg et al. |
| 2007/0157267 A1 | 7/2007 | Lopez-Estrada |
| 2007/0159476 A1 | 7/2007 | Grasnick |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0177811 A1 | 8/2007 | Yang et al. |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230564 A1 | 10/2007 | Chen et al. |
| 2007/0230568 A1 | 10/2007 | Eleftheriadis et al. |
| 2007/0233784 A1 | 10/2007 | Orourke et al. |
| 2007/0255844 A1 | 11/2007 | Shen et al. |
| 2007/0274389 A1 | 11/2007 | Kim et al. |
| 2007/0277209 A1 | 11/2007 | Yousef |
| 2008/0010153 A1 | 1/2008 | Pugh-O'Connor et al. |
| 2008/0034273 A1 | 2/2008 | Luby |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0152241 A1 | 6/2008 | Itoi et al. |
| 2008/0168133 A1 | 7/2008 | Osborne |
| 2008/0168516 A1 | 7/2008 | Flick et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0303896 A1 | 12/2008 | Lipton et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0195640 A1* | 8/2009 | Kim .................. H04N 13/004 348/43 |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0219985 A1 | 9/2009 | Swaminathan et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1* | 12/2009 | Schnell .............. G06F 17/3002 |
| 2009/0328228 A1 | 12/2009 | Schnell |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0046906 A1 | 2/2010 | Kanamori et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van Gassel et al. |
| 2010/0165077 A1 | 7/2010 | Yin et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0262628 A1* | 10/2010 | Singer .............. H04N 21/21805 707/803 |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1 | 11/2011 | Park et al. |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |

(56) References Cited

U.S. PATENT DOCUMENTS

| | | |
|---|---|---|
| 2012/0047280 A1 | 2/2012 | Park et al. |
| 2012/0099593 A1 | 4/2012 | Luby |
| 2012/0105583 A1 | 5/2012 | Suh et al. |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0380113 A1 | 12/2014 | Luby |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1806392 A | 7/2006 |
| CN | 1819661 A | 8/2006 |
| CN | 101371584 A | 2/2009 |
| CN | 101390399 A | 3/2009 |
| CN | 101622879 A | 1/2010 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1024672 A1 | 8/2000 |
| EP | 1051027 A1 | 11/2000 |
| EP | 1124344 A1 | 8/2001 |
| EP | 1298931 A2 | 4/2003 |
| EP | 1406452 A2 | 4/2004 |
| EP | 1455504 A2 | 9/2004 |
| EP | 1501318 A1 | 1/2005 |
| EP | 1670256 A2 | 6/2006 |
| EP | 1755248 A1 | 2/2007 |
| EP | 2046044 A1 | 4/2009 |
| EP | 2071827 A2 | 6/2009 |
| EP | 2096870 A2 | 9/2009 |
| EP | 1700410 B1 | 4/2010 |
| EP | 2323390 A2 | 5/2011 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003018568 A | 1/2003 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007506167 A | 3/2007 |
| JP | 2007089137 A | 4/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2009027598 A | 2/2009 |
| JP | 2009522922 A | 6/2009 |
| JP | 2009171558 A | 7/2009 |
| JP | 2009527949 A | 7/2009 |
| JP | 2009544991 A | 12/2009 |
| JP | 2010539832 A | 12/2010 |
| JP | 2011087103 A | 4/2011 |
| KR | 1020030071815 | 9/2003 |
| KR | 1020030074386 A | 9/2003 |
| KR | 20040107152 | 12/2004 |
| KR | 20040107401 A | 12/2004 |
| KR | 20050009376 A | 1/2005 |
| KR | 100479206 B1 | 3/2005 |
| KR | 100809086 B1 | 3/2008 |
| KR | 20080083299 A | 9/2008 |
| KR | 20090098919 A | 9/2009 |
| KR | 20100015611 A | 2/2010 |
| KR | 20100028156 A | 3/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| TW | I246841 B | 1/2006 |
| TW | I354908 | 12/2011 |
| TW | I355168 | 12/2011 |
| WO | 9634463 A1 | 10/1996 |
| WO | 9750183 A1 | 12/1997 |
| WO | 9804973 A1 | 2/1998 |
| WO | 9832256 A1 | 7/1998 |

(56) References Cited

FOREIGN PATENT DOCUMENTS

| WO | 0014921 A1 | 3/2000 |
|---|---|---|
| WO | 0052600 A1 | 9/2000 |
| WO | 0157667 A1 | 8/2001 |
| WO | 0158130 A2 | 8/2001 |
| WO | 0158131 A2 | 8/2001 |
| WO | 0227988 A2 | 4/2002 |
| WO | 02063461 A1 | 8/2002 |
| WO | WO-03046742 A1 | 6/2003 |
| WO | WO-03105484 A1 | 12/2003 |
| WO | 2004008735 A2 | 1/2004 |
| WO | 2004015948 A1 | 2/2004 |
| WO | 2004019521 A1 | 3/2004 |
| WO | 2004030273 A1 | 4/2004 |
| WO | 2004036824 A1 | 4/2004 |
| WO | 2004040831 A1 | 5/2004 |
| WO | 2004047019 A2 | 6/2004 |
| WO | 2004047455 A1 | 6/2004 |
| WO | WO-2004088988 A1 | 10/2004 |
| WO | 2004105300 | 12/2004 |
| WO | 2004109538 A1 | 12/2004 |
| WO | 2005022812 | 3/2005 |
| WO | 2005041421 A1 | 5/2005 |
| WO | 2005078982 A1 | 8/2005 |
| WO | 2005107123 | 11/2005 |
| WO | 2005120079 A2 | 12/2005 |
| WO | 2006013459 A1 | 2/2006 |
| WO | 2006036276 | 4/2006 |
| WO | 2006057938 A2 | 6/2006 |
| WO | 2006060036 A1 | 6/2006 |
| WO | 2006084503 A1 | 8/2006 |
| WO | 2006116102 A2 | 11/2006 |
| WO | 2006135877 A2 | 12/2006 |
| WO | 2006135878 A2 | 12/2006 |
| WO | 2007042916 | 4/2007 |
| WO | 2007078253 A2 | 7/2007 |
| WO | 2007090834 A2 | 8/2007 |
| WO | 2007098397 A2 | 8/2007 |
| WO | WO-2007098480 A1 | 8/2007 |
| WO | WO-2007115129 | 10/2007 |
| WO | 2008011549 A2 | 1/2008 |
| WO | 2008023328 A3 | 4/2008 |
| WO | 2008054100 A1 | 5/2008 |
| WO | 2008085013 A1 | 7/2008 |
| WO | 2008086313 A1 | 7/2008 |
| WO | 2008144004 A1 | 11/2008 |
| WO | 2008148708 A1 | 12/2008 |
| WO | 2008156390 A1 | 12/2008 |
| WO | WO-2009065526 A1 | 5/2009 |
| WO | WO-2009137705 A2 | 11/2009 |
| WO | 2009143741 A1 | 12/2009 |
| WO | WO-2010041896 A2 | 4/2010 |
| WO | 2010085361 A2 | 7/2010 |
| WO | 2010088420 A1 | 8/2010 |
| WO | 2010120804 A1 | 10/2010 |
| WO | WO-2011038013 | 3/2011 |
| WO | WO-2011038034 A1 | 3/2011 |
| WO | 2011059286 A2 | 5/2011 |
| WO | 2011070552 A1 | 6/2011 |
| WO | 2011102792 A1 | 8/2011 |
| WO | WO-2012021540 | 2/2012 |
| WO | 2012109614 A1 | 8/2012 |

OTHER PUBLICATIONS

Kimata H et al., "Inter-View Prediction With Downsampled Reference Pictures", ITU Study Group 16—Video Coding Experts Group—ISO/IEC MPEG & ITU-T VCEG(ISO/IEC JTC1/SC29/WG11 and ITU-T SG16 Q6), No. JVT-W079, Apr. 19, 2007 (Apr. 19, 2007), XP030007039.

Kimura et al., "A Highly Mobile SDM-0FDM System Using Reduced-Complexity-and-Latency Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007.4394758.

Kozamernik F: "Media streaming over the Internet", Internet Citation, Oct. 2002 (Oct. 2002), XP002266291, Retrieved from the Internet: URL: http://www.ebu.ch/trev_292-kozamerni k. pdf [retrieved on Jan. 8, 2004] section "Video codecs for scalable streaming".

Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.

Lee L., et al., "VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.

Li, M., et al., "Playout Buffer and Rate Optimization for Streaming over IEEE 802.11 Wireless Networks", Aug. 2009, Worcester Polytechnic Institute, USA.

Lin, S. et al.: "Error Control Coding-Fundamentals and Applications," 1983, Englewood Cliffs, pp. 288, XP002305226.

Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007 (Oct. 1, 2007), XP015055125, ISSN: 0000-0003.

Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.

Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].

Luby, et al., "FLUTE—File Delivery over Unidirectional Transport", IETF RFC 3926, Oct. 2004, pp. 1-35.

Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, pp. 1-9, New York, NY, USA, IEEE, US Aug. 16, 199.

Luby et, al. "Layered Coding Transport (LCT) Building Block", IETF RFC 5651, pp. 1-42, (Oct. 2009).

Luby et al., RaptorQ Forward Error Correction Scheme for Object Delivery draft-ietf-rmt-bb-fec-raptorq-00, Qualcomm, Inc. Jan. 28, 2010.

Luby, M. et al.: "Efficient Erasure Correction Codes," 2001, IEEE Transactions on Information Theory, Vo. 47, No. 2, pp. 569-584, XP002305225.

Luby, M., et, al. "Forward Error Correction (FEC) Building Block", IETF RFC 5052, pp. 1-31, (Aug. 2007).

Luby M et al: "IPTV Systems, Standards and Architectures: Part II—Application Layer FEC in IPTV Services" IEEE Communications Magazine, IEEE Service Center, Piscataway, US LNKDDOI: 10.1109/MCOM.2008.4511656, vol. 46, No. 5, May 1, 2008 (May 1, 2008), pp. 94-101, XP011226858 ISSN: 0163-6804.

Luby, M. et al.: "Pairwise Independence and Derandomization," Foundations and Trends in Theoretical Computer Science, vol. 1, Issue 4, 2005, Print ISSN 1551-305X, Online ISSN 1551-3068.

Luby, M. et al., "Practical Loss-Resilient Codes: Tornado Codes," 29th Annual ACM Symposium on Theory of Computing, vol. SYMP. 29, May 4, 1997, pp. 150-159, XP002271229.

Luby, M., et al., "Raptor Forward Error Correction Scheme for Object Delivery", IETF RFC5053, pp. 1-46 (Sep. 2007).

Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].

Luby, M., et al., "Request for Comments: 3453: The Use of Forward Error Correction (FEC) in Reliable Multicast," Internet Article, [Online] Dec. 2002, pp. 1-19.

Luby M., "Simple Forward Error Correction (FEC) Schemes," draft-luby-rmt-bb-fec-supp-simple-00.txt, pp. 1-14, Jun. 2004.

Luby M., "LT Codes", Foundations of Computer Science, 2002, Proceedings, The 43rd Annual IEEE Symposium on, 2002.

(56) References Cited

OTHER PUBLICATIONS

Luby, Michael G. "Analysis of Random Processes via And-Or Tree Evaluation," Proceedings of the 9th Annual ACM-SIAM Symposium on Discrete Algorithms, TR-97-0, 1998, pp. 364-373, (search date: Jan. 25, 2010) URL: <http://portal. acm.prg.citation.cfm"id=314722>.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].
Mackay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-COM:20050237.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Mandelbaum D.M., "An Adaptive-Feedback Coding Scheme Using Incremental Redundancy", IEEE Trans on Information Theory, vol. May 1974, May 1974 (May 1974), pp. 388-389, XP002628271, the whole document.
Marpe, D., et al., "The H.264/MPEG4 Advanced Video Coding Standard and its Applications," Standards Report, IEEE Communications Magazine, Aug. 2006, pp. 134-143.
Matsuoka H., et al., "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan, ITC-SS21, 2010 IEICE, pp. 59-63.
McCanne, et al., "Low-Complexity Video Coding for Receiver-Driven Layered Multicast", IEEE Journal on Selected Areas in Communication IEEE Service Center, Aug. 1, 1997 (Aug. 1, 1997), vol. 15, No. 6, pp. 983-1001, Piscataway, US, XP011054678, ISSN: 0733-8716.
Michael G et al., "Improved low-density parity-check codes using irregular graphs", Information Theory, IEEE Transactions on,Feb. 2001,vol. 47, No. 2,pp. 585-598.
Miller G., et al., "Bounds on the maximum likelihood decoding error probability of low density parity check codes", Information Theory, 2000. Proceedings. IEEE International Symposium on, 2000, p. 290.
Mimnaugh, A et, al. "Enabling Mobile Coverage for DVB-T" Digital Fountain Whitepaper Jan. 29, 2008 (Jan. 29, 2008), pp. 1-9, XP002581808 Retrieved from the Internet: URL:http://www.digitalfountain.com/ufiles/ library/DVB-T-whitepaper.pdf> [retrieved on May 10, 2010].
Min-Goo Kim: "On systematic punctured convolutional codes", IEEE Trans on Communications, vol. 45, No. 2, Feb. 1997 (Feb. 1997), XP002628272, the whole document, pp. 133-139.
Morioka S., "A Verification Methodology for Error Correction Circuits over Galois Fields", Tokyo Research Laboratory, IBM Japan Ltd, pp. 275-280, Apr. 22-23, 2002.
Moriyama, S., "5. Present Situation of Terrestrial Digital Broadcasting in Europe and USA", Journal of the Institute of Image Information and Television Engineers, Nov. 20, 1999, vol. 53, No. 11, pp. 1476-1478.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_Channel_Mappi ng_to_BCAST_File_Delivery, Open Mobile Alliance (OMA), 4330 La Jolla Village Dr., Suite 100 San Diego, CA 92122; USA Oct. 2, 2007 (Oct. 2, 2007), pp. 1-13, XP064036903.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Muramatsu J., et al., "Low density parity check matrices for coding of multiple access networks", Information Theory Workshop, 2003. Proceedings. 2003 IEEE , Apr. 4, 2003, pp. 304-307.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
Nokia: "Reed-Solomon Code Specification for. MBMS Download and Streaming Services", 3GPP Draft; S4-050265_RS_SPEC, 3rd Generation Partnership Project (3GPP), Mobile Competence Centre; 650, Route Des Lucioles ; F-06921 Sophia-Antipolis Cedex ; France, vol. SA WG4, no. San Diego, USA; Apr. 15, 2005, Apr. 15, 2005 (Apr. 15, 2005), XP050287675, [retrieved on Apr. 15, 2005].
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Ramsey B, "HTTP Status: 206 Partial Content and Range Requests," May 5, 2008 obtained at http://benramsey.com/blog/2008/05/206-partial-content-and-range-requests/.
Gerard F., et al., "HTTP Streaming MPEG media—Response to CFP", 93. MPEG Meeting, Geneva Jul. 26, 2010 to Jul. 30, 2010.
Chikara S., et al., "Add-on Download Scheme for Multicast Content Distribution Using LT Codes", IEICE. B, Communications, Aug. 1, 2006, J89-B (8), pp. 1379-1389.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995 (Jul. 1, 1995), pp. 938-942, XP000525729, ISSN: 0018-9340, DOI: 10.1109/12.392853.
Tetsuo M., et al., "Comparison of Loss Resilient Ability between Multi-Stage and Reed-Solomon Coding", Technical report of IEICE. CQ, Communication Quality, vol. 103 (178), Jul. 4, 2003, pp. 19-24.
Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.
Watson M., et al., "Raptor FEC Schemes for FECFRAME draft-ietf-fecframe-raptor-04," 2010, pp. 1-21, URL,http://tools.ietf.org/pdf/draft-ietf-fecframe-raptor-04.pdf.
Dan, A. et al.: "Scheduling Policies for an On-Demand Video Server with Batching," Proc. ACM Multimedia, pp. 15-23 (Oct. 1998).
Davey, M.C. et al.: "Low Density Parity Check Codes over GF(q)" IEEE Communications Letters, vol. 2, No. 6 pp. 165-167 (1998).
David Singer, et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.
Digital Fountain: "Specification Text for Raptor Forward Error Correction," TDOC S4-050249 of 3GPP TSG SA WG 4 Meeting #34 [Online](Feb. 25, 2005) pp. 1-23, XP002425167, Retrieved from the Internet: URL:http://www.3gpp.org/ftp/tsg_sa/WG4_CODEC/TSGS4_34/Docs.

(56) References Cited

OTHER PUBLICATIONS

Digital Fountain: "Raptor code specification for MBMS file download," 3GPP SA4 PSM Ad-Hoc #31 (May 21, 2004) XP002355055 pp. 1-6.

"Digital Video Broadcasting (DVB); Framing structure, channel coding and modulation for digital terrestrial television; ETSI EN 300 744" ETSI Standards, Lis, Sophia Antipolis Cedex, France, V1.6.1, pp. 9, Jan. 10, 2009 (Jan. 2009).

"Digital Video Broadcasting (DVB); Guidelines for the implementation of DVB-IP Phase 1 specifications; ETSI TS 102 542" ETSI Standards, LIS, Sophia Antipoliscedex, France, vol. BC, No. V1.2.1, Apr. 1, 2008 (Apr. 1, 2008), XP014041619 ISSN: 0000-0001 p. 43 p. 66 pp. 70, 71.

DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.

Eager, et al. "Minimizing bandwidth requirements for on-demand data delivery," Proceedings of the International Workshop on Advances in Multimedia Information Systems,p. 80-87 (Indian Wells, CA Oct. 1999).

Eager, et al., "Optimal and efficient merging schedules for video-on-demand servers", Proc. ACM Multimedia, vol. 7, pp. 199-202 (1999).

Esaki, et al.: "Reliable IP Multicast Communication Over ATM Networks Using Forward Error Correction Policy," IEICE Transactions on Communications, JP, Institute of Electronics Information and Comm. Eng. Tokyo, vol. E78-V, No. 12, (Dec. 1995), pp. 1622-1637, XP000556183.

Feng, G., Error Correcting Codes over Z2m for Algorithm-Based Fault-Tolerance, IEEE Transactions on Computers, vol. 43, No. 3, Mar. 1994, pp. 370-374.

Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010 (Jul. 22, 2010), XP030046346.

Fielding et al., "RFC 2616: Hypertext Transfer Protocol HTTP/1.1", Internet Citation, Jun. 1999 (Jun. 1999), pp. 165, XP002196143, Retrieved from the Internet: URL:http://www.rfc-editor-org/ [retrieved on Apr. 15, 2002].

Frojdh, et al., "File format sub-track selection and switching," ISO/IEC JTC1/SC29/WG11 MPEG2009 M16665, London UK., Jul. 2009, 14 pp.

Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion Picturexpert Group or ISO/ IEC JTC1/SC29/WG11), , No. M13855, Oct. 13, 2006 (Oct. 13, 2006), XP030042523, ISSN: 0000-0233.

Gao, L. et al.: "Efficient Schemes for Broadcasting Popular Videos," Proc. Inter. Workshop on Network and Operating System Support for Digital Audio and Video, pp. 1-13 (1998).

Gasiba, Tiago et al., "System Design and Advanced Receiver Techniques for MBMS Broadcast Services" Proc. 2006 International Conference on Communications (ICC 2006), Jun. 1, 2006 (Jun. 1, 2006), pp. 5444-5450, XP031025781 ISBN: 978-1-4244-0354-7.

Gemmell, et al., "A Scalable Multicast Architecture for One-to-Many Telepresentations", Multimedia Computing and Systems, 1998/ Proceedings. IEEE International Conference on Austin, TX, USA Jun. 28-Jul. 1, 1998, Los Alamitos, CA USA, IEEE Comput. Soc, US, Jun. 28, 1998, pp. 128-139, XP010291559.

Gil A., et al., "Personalized Multimedia Touristic Services for Hybrid Broadcast/Broadband Mobile Receivers," IEEE Transactions on Consumer Electronics, 2010, vol. 56 (1), pp. 211-219.

Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].

Gozalvez D et, al: "Mobile reception of DVB-T services by means of AL-FEC protection" Proc. IEEE Intern. Symposium on Broadband Multimedia Systems and Broadcasting (BMSB '09), IEEE, Piscataway, NJ, USA, May 13, 2009 (May 13, 2009), pp. 1-5, XP031480155 ISBN: 978-1-4244-2590-7.

Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.

Gruneberg, et al., "Deliverable D3.2 MVC/SVC storage format", Information and Communication Technologies (ICT) Programme No. FP7-ICT-214063, Jan. 29, 2009 (Jan. 29, 2009), XP002599508 Retrieved from the Internet: URL:http://www.ist-sea.eu/Public/SEA_D3.2_HHI FF_20090129.pdf [retrieved on Sep. 1, 2010] paragraph [02.3].

Hagenauer, J. : "Soft is better than hard" Communications, Coding and Cryptology, Kluwer Publication May 1994 (May 1994), XP002606615 Retrieved from the Internet : URL: http://www. Int . ei .turn. de/veroeffentlic hungen/I994/ccc94h. pdf [retrieved on Oct. 25, 2010].

Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011 (Jul. 21, 2011), XP030049659.

Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011 (Jul. 22, 2011), XP030049998.

He Wenge et al., "Asymmetric Stereoscopic Video Encoding Algorithm Based on Joint Compensation Prediction", IEEE International Conference on Communications and Mobile Computing, Jan. 6, 2009 (Jan. 6, 2009), pp. 191-194, XP031434775, ISBN: 978-0-7695-3501-2.

Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.

Hitachi Ltd. et al., "High-Definition Multimedia Interface," Specification Version 1.3a, Nov. 10, 2006, 276 pp.

Hitachi Ltd. et al., "High-Definition Multimedia Interface," Specification Version 1.4, Jun. 5, 2009, 425 pp.

Hua, et al., "Skyscraper broadcasting: A new broadcsting system for metropolitan video-on-demand systems", Proc. ACM SIGCOMM, pp. 89-100 (Cannes, France, 1997).

Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex ; France, vol. RAN WG1, no. Warsaw, Poland, Jun. 24, 2008, XP050110650, [retrieved on Jun. 24, 2008].

Ian Trow, "Is 3D Event Coverage Using Existing Broadcast Infrastructure Technically Possible", International Broadcasting Conference, Sep. 9, 2009 (Sep. 9, 2009)-Sep. 13, 2009 (Sep. 13, 2009), XP030081671, pp. 4-5, "3D transmission over broadcast infrastructure" pp. 7-8, "Screen signaling"—Conclusions on 3D systems.

IETF RFC 2733: Rosenberg, J. et al. "An RTP Payload Format for Generic Forward Error Correction," Network Working Group, RFC 2733 (Dec. 1999).

Information Technology—Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.

International Standard ISO/IEC 13818-1:2000(E), "Information Technology—Generic Coding of Moving Pictures and Associated Audio Information: Systems," Second edition, Dec. 1, 2000, pp. 1-174.

International Standard ISO/IEC 14496-12, Information Technology—Coding of audio-visual objects—Part 12: ISO base media file format, Third Edition, Oct. 15, 2008, 120 pp.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

(56) References Cited

OTHER PUBLICATIONS

ISO/IEC 14996-12 International Standard, "Information technology—Coding of audio-visual objects Part 12: ISO base media file format," Oct. 1, 2005, 94 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
ISO/IEC JTC1/SC29/WG11: "Requirements on HTTP Streaming of MPEG Media", 92. MPEG Meeting; Apr. 19, 2010-Apr. 23, 2010; Dresden; No. N11340, May 14, 2010 (May 14, 2010), XP030017837, ISSN: 0000-0029.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol. 3, Mar. 18, 2005 (Mar. 18, 2005), pp. 1097-1100, XP010792442, DOI: 10.1109/ICASSP.2005.1415905 ISBN: 978-0-7803-8874-1.
"Joint Draft 8.0 on Multiview Video Coding", 28th JVT meeting, Hannover, Germany, Document: JVT-AB204 (rev.1), Jul. 2008. available from http:// wftp3. itu.int/av-arch/jvt-site/2008_07_Hannover/JVT-AB204.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kim J., et al., "Enhanced Adaptive Modulation and Coding Schemes Based on Multiple Channel Reportings for Wireless Multicast Systems", 62nd IEEE Vehicular Technology Conference, VTC-2005-Fall, Sep. 25-28, 2005, vol. 2, pp. 725-729, XP010878578, DOI: 1 0.11 09/VETECF.2005.1558019, ISBN: 978-0-7803-9152-9.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005 (Jun. 1, 2005), XP002695256, Retrieved from the Internet: URL:http://www.etsi.org/deliver/etsi_ts/126300_126399/126346/06.01.00_60/ts_126346v060100p.pdf.
3GPP TS 26.234 V9.1.0,"3rd Generation Partnership Project; Technical Specification Group Services and System Aspects; Transparent end-to-end Packet-switched Streaming Service (PSS); Protocols and codecs (Release 9)", Dec. 2009, 179 pages.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.
3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.
3rd Generation Partnership Project, Technical Specification Group Services and System Aspects Transparent end-to-end packet switched streaming service (PSS), 3GPP file format (3GP) (Release 9 ) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009 (Jun. 1, 2009), pp. 1-52, XP050370199.
3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010 (Jun. 9, 2010), pp. 1-55, XP050441544, [retrieved on Jun. 9, 2010].
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Center ; 650, Route Des Lucioles ; F-06921 Sophia-Antipolis Cedex ; France, vol. SA WG4, No. V10.0.0, Jun. 17, 2011 (Jun. 17, 2011), pp. 1-94, XP050553206, [retrieved on Jun. 17, 2011].
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 p. 85-102,URL,http://www.3gpp.org/ftp/TSG_SA/WG4_CODEC/TSGS4_59/Docs/S4-100511.zip, 26234-930.zip.
Afzal, et al., "Video Streaming over MBMS: A System Design Approach", Journal of Multimedia, vol. 1, No. 5, Aug. 2006, pp. 25-35.
Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).
Aggarwal, C. et al.: "On Optimal Batching Policies for Video-on-Demand Storage Servers," Multimedia Systems, vol. 4, No. 4, pp. 253-258 (1996).
Albanese, A., et al., "Priority Encoding Transmission", IEEE Transactions on Information Theory, vol. 42, No. 6, pp. 1-22, (Nov. 1996).
Alex Zambelli,"IIS Smooth Streaming Technical Overview", Microsoft Mar. 25, 2009 (Mar. 25, 2009), XP002620446, Retrieved from the Internet: URL:http://www.microsoft.com/downloads/en/details. aspx"FamilyID=03d22583-3ed6-44da-8464-blb4b5ca7520, [retrieved on Jan. 21, 2011].
Almeroth, et al., "The use of multicast delivery to provide a scaleable and interactive video-on-demand service", IEEE Journal on Selected Areas in Communication, 14(6): 1110-1122, (1996).
Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.
Amin Shokrollahi: "LDPC Codes: An Introduction" Internet Citation 2 Apr. 1, 2003 (Apr. 2, 2003), XP002360065 Retrieved from the Internet: URL : http ://www . ipm. ac . ir/IPM/homepage/Amin 2.pdf [retrieved on Dec. 19, 2005].
Amon P et al., "File Format for Scalable Video Coding", IEEE Transactions on Circuits and Systems for Video Technology, IEEE Service Center, Piscataway, NJ, US, vol. 17, No. 9, Sep. 1, 2007 (Sep. 1, 2007), pp. 1174-1185, XP011193013, ISSN: 1051-8215, DOI:10.1109/TCSVT.2007.905521.
Anonymous: [Gruneberg, K., Narasimhan, S. and Chen, Y., editors] "Text of ISO/IEC 13818-1:2007/PDAM 6 MVC operation point descriptor", 90 MPEG Meeting; Oct. 26, 2009-Oct. 30, 2009; Xian; (Motion Picture ExpertGroup or ISO/IEC JTC1/SC29/WG11), No. N10942, Nov. 19, 2009 (Nov. 19, 2009), XP030017441.
Anonymous: "Technologies under Consideration", 100. MPEG Meeting;Apr. 30, 2012-May 4, 2012; Geneva; (Motion Picture Expert Group or ISO/IEC JTC1 /SC29/WG11),, No. N12682, Jun. 7, 2012 (Jun. 7, 2012), XP030019156.
Anonymous: "Technologies under Consideration", 98. MPEG Meeting; Nov. 28, 2011-Feb. 12, 2011; Geneva; (Motion Picture Expert Group or ISO/IEC JTC1/SC29/WG11),, No. N12330, Dec. 3, 2011 (Dec. 3, 2011), XP030018825.

(56) References Cited

OTHER PUBLICATIONS

Anonymous: "Text of ISO/IEC 14496-12 3rd Edition", 83 MPEG Meeting; Jan. 14, 2008-Jan. 18, 2008; Antalya; (Motion PictureExpert Group or ISO/IEC JTC1/SC29/WG11), No. N9678, Apr. 22, 2008 (Apr. 22, 2008), XP030016172.
Anonymous: "Text of ISO/IEC 14496-12:2008/PDAM 2 & ISO/IEC 15444-12:2008/PDAM 2 Sub-track selection & switching", 91. Mpeg Meeting; Jan. 18, 2010-Jan. 22, 2010; Kyoto; (Motion Picture Expertgroup or ISO/IEC JTC1/SC29/WG11), No. N11137, Jan. 22, 2010 (Jan. 22, 2010), XP030017634, ISSN: 0000-0030.
Anonymous: "Text of ISO/IEC 14496-15 2nd edition", 91 MPEG Meeting; Jan. 18, 2010-Jan. 22, 2010; Kyoto; (Motion Picture ExpertGroup or ISO/IEC JTC1/SC29/WG11),, No. N11139, Jan. 22, 2010 (Jan. 22, 2010), XP030017636, ISSN: 0000-0030 the whole document.
Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/WG11),, No. N12329, Jan. 6, 2012 (Jan. 6, 2012), XP030018824.
Apple Inc., "On the time-stamps in the segment-inbox for httpstreaming (26.244, R9)", TSG-SA4#58 meeting, Vancouver, Canada, Apr. 2010, p. 5.
ATIS: "PTV Content On Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].
Bar-Noy, et al., "Competitive on-line stream merging algorithms for media-on-demand", Draft (Jul. 2000), pp. 1-34.
Bar-Noy et al. "Efficient algorithms for optimal stream merging for media-on-demand," Draft (Aug. 2000), pp. 1-43.
Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 889-893, XP000464977.
Bitner, J.R., et al.: "Efficient Generation of the Binary Reflected Gray code and Its Applications," Communications of the ACM, pp. 517-521, vol. 19 (9), 1976.
Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].
Bouazizi I., et al., "Proposals for ALC/FLUTE server file format (14496-12Amd.2)", 77. MPEG Meeting; Jul. 17, 2006-Jul. 21, 2006; Klagenfurt; (Motion PictureExpert Group or ISO/IEC JTC1/SC29/WG11), No. M13675, Jul. 12, 2006 (Jul. 12, 2006), XP030042344, ISSN: 0000-0236.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Byers, J.W. et al.: "Accessing multiple mirror sites in parallel: using Tornado codes to speed up downloads," 1999, Eighteenth Annual Joint Conference of the IEEE Computer and Communications Socities, pp. 275-283, Mar. 21, 1999, XP000868811.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Charles Lee L.H, "Error-Control Block Codes for Communications Engineers", 2000, Artech House, XP002642221.
Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Chen, et al., U.S. Patent Application titled "Frame Packing for Asymmetric Stereo Video", filed Feb. 25, 2011.
Chen, et al., U.S. Patent Application titled "One-Stream Coding for Asymmetric Stereo Video", filed Feb. 25, 2011.
Chen Ying et al., "Coding techniques in Multiview Video Coding and Joint Multiview Video Model", Picture Coding Symposium, 2009, PCS 2009, IEEE, Piscataway, NJ, USA, May 6, 2009 (May 6, 2009), pp. 1-4, XP031491747, ISBN: 978-1-4244-4593-6.
Choi S: "Temporarily enhanced erasure codes for reliable communication protocols" Computer Networks, Elsevier Science Publishers B.V., Amsterdam, NL, vol. 38, No. 6, Apr. 22, 2002 (Apr. 22, 2002), pp. 713-730, XP004345778, ISSN: 1389-1286, DOI:10.1016/S1389-1286(01)00280-8.
Clark G.C., et al., "Error Correction Coding for Digital Communications, System Applications," Error Correction Coding for Digital Communications, New York, Plenum Press, US, Jan. 1, 1981, pp. 331-341.
D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009 (Dec. 31, 2009), pp. 1-10, XP002582035 Retrieved from the Internet: URL:http://www.hindawi.com/journals/ijdmb/ 2009/614178.html> [retrieved on May 12, 2010].
Viswanathan,Subramaniyam R., "Publishing in Wireless and Wireline Environments," Ph. D Thesis, Rutgers, The State University of New Jersey (Nov. 1994), 180pages.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Wang,"On Random Access", Joint Video Team (JVT) of ISO/IEC MPEG & ITU-T VCEG (ISO/IEC JTC1ISC29/WG11 and ITU-T SG16 Q.6), 4th Meeting: Klagenfurt, Austria, Jul. 22-26, 2002, p. 13.
Watson, M., et, al. "Asynchronous Layered Coding (ALC) Protocol Instantiation", IETF RFC 5775, pp. 1-23, (Apr. 2010).
Wenger, et al., RFC 3984, "RTP Payload Format for H.264 Video," Feb. 2005, 84 pp.
Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video

(56) References Cited

OTHER PUBLICATIONS

Coding (JCT-VC), of ITU-T SG16 WP3 and ISO/IEC JTC1/SC29/WG11, 3rd Meeting: Guangzhou, CN, Oct. 7-15, 2010.
Wong, J.W., "Broadcast delivery", Proceedings of the IEEE, 76(12): 1566-1577, (1988).
Yamanouchi N., et al., "Internet Multimedia Transmission with Packet Recovery by Using Forward Error Correction," Proceedings of DPS Workshop, The Information Processing Society of Japan, Dec. 6, 2000, vol. 2000, No. 15, pp. 145-150.
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, (Nov. 21, 2002) pp. 1551-1553.
Zorzi, et al.: "On the Statistics of Block Errors in Bursty Channels," IEEE Transactions on Communications, vol. 45, No. 6, Jun. 1997, pp. 660-667.
Pantos R et al., "HTTP Live Streaming; draft-pantos-http-live-streaming-OT.txt ", HTTP Live Streaming; Draft-Pant0s-HTTP-Live-Streaming-01.Txt, Internet Engineering Task Force, IETF; Standardworkingdraft, Internet Society (ISOC) 4, Rue Des Falaises CH-1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997 (Sep. 1, 1997), pp. 995-1012, XP00069594.
Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: "A Correction and an Addendum for Variable-Rate Coding for Meteor-Burst Communications," IEEE Transactions on Communications, vol. 43, No. 12 pp. 2866-2867 (Dec. 1995).
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010 (Jul. 22, 2010), XP030046492.
Qualcomm Europe S A R L: "Baseline Architecture and Definitions for HTTP Streaming", 3GPP Draft; S4-090603_HTTP_Streaming_Architecture, 3rd Generation Partnership Project (3GPP), Mobile Competence Centre; 650, Route Des Lucioles; F-06921 Sophia-Antipolis Cedex; France, no. Kista; Aug. 12, 2009, Aug. 12, 2009 (Aug. 12, 2009), XP050356889.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.
Qualcomm Incorporated: "RaptorQ Technical Overview", pp. 1-12, Oct. 1, 2010.
Qualcomm Incorporated: "Use Cases and Examples for Adaptive httpstreaming", 3GPP Draft; S4-100408-Usecases-HSD, 3rd Generation Partnership Project (JGPP), Mobile Competence Centre; 650, Route Des Lucioles; F-06921 Sophia-Antipolis Cedex; France, vol. SA WG4, no. Prague, Czech Republic; Jun. 21, 2010, Jun. 17, 2010 (Jun. 17, 2010), XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc et al., "Format for HTTP Streaming Media Presentation Description", 3GPP Draft; S4-100020, 3rd Generation Partnership Project (3GPP), Mobile Competence Centre; 650, Route Des Lucioles; F-06921 Sophia-Anti Polis Cedex; France, vol. SA WG4, no. St Julians, Malta; Jan. 25, 2010, Jan. 20, 2010 (Jan. 20, 2010), XP050437753, [retrieved on Jan. 20, 2010].
Research in Motion UK Limited: "An MPD delta file for httpstreaming", 3GPP Draft; S4-100453, 3rd Generation Partnership Project (SGPP), Mobile Competence Centre; 650, Route Des Lucioles; F-06921 Sophia-Antipolis Cedex; France, vol. SA WG4, no. Prague, Czech Republic; Jun. 21, 2010, Jun. 16, 2010 (Jun. 16, 2010), XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010 (Jul. 26, 2010), XP030046369.
Rizzo L. "Effective Erasure Codes for Reliable Computer Communication Protocols," Computer Communication Review, 27 (2) pp. 24-36 (Apr. 1, 1997), XP000696916.
Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V., et, al. "Low Density Parity Check (LDPC) Staircase and Triangle Forward Error Correction (FEC) Schemes", IETF RFC 5170 (Jun. 2008), pp. 1-34.
Rost, S. et al., "The Cyclone Server Architecture: streamlining delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Roumy A., et al., "Unequal Erasure Protection and Object Bundle Protection with the Generalized Object Encoding Approach", Inria-00612583, Version 1, Jul. 29, 2011, 25 pages.
Samukawa, H. "Blocked Algorithm for LU Decomposition" Journal of the Information Processing Society of Japan, Mar. 15, 1993, vol. 34, No. 3, pp. 398-408.
Schulzrinne, et al., "Real Time Streaming Protocol (RTSP)" Network Working Group, Request for Comments: 2326, Apr. 1998, pp. 1-92.
Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of

(56) References Cited

OTHER PUBLICATIONS

Multiview Video over ITU-T Rec. H.222.0 ISO/IEC 13818-1" ITU-T REC. H.222.0(May 2006)FPDAM 4, vol. MPEG2009, No. 10572, May 11, 2009 (May 11, 2009), pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm"id=1148681>.
Shokrollahi et al., "Design of Efficient Easure Codes with Differential Evolution", IEEE International Symposium on Information Theory, Jun. 25, 2000 (Jun. 25, 2000), pp. 5-5.
Sincoskie, W. D., "System Architecture for Large Scale Video on Demand Service," Computer Network and ISDN Systems, pp. 155-162, (1991).
Smolic et al., "Development of a new MPEG standard for advanced 3D video applications", Proceedings of 6th International Symposium on Image and Signal Processing and Analysis (ISPA), Sep. 16, 2009, pp. 400-407, IEEE, XP031552049, ISBN: 978-953-184-135-1.
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011 (Jul. 24, 2011), XP030048903.
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.265|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; S4-100080-MPD, 3rd Generation Partnership Project (3GPP), Mobile Competence Centre; 650, Route Des Lucioles; F-06921 Sophia-Antipolis Cedex; France, vol. SA WG4, no. St. Julians, Malta; Jan. 25, 2010, Jan. 20, 2010 (Jan. 20, 2010), XP050437773, [retrieved on Jan. 20, 2010].
Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, NS2003-331, IN2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010 (Jun. 1, 2010), XP014047290, pp. 1-178.
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Fehn C., et al., "Asymmetric Coding of Stereoscopic Video for Transmission Over T-DMB", 3DTV Conference, May 2007, pp. 1-4.
ISO/IEC 14496-10:2009/FDAM 1:2009(E): "Information technology—Coding of audio-visual objects—Part 10: Advanced Video Coding, Amendment 1: Constrained baseline profile, stereo high profile and frame packing arrangement SEI message," (MPEG of ISO/IEC JTC 1/SC 29/WG 11, w10707r3), International Organization for Standardization, Geneva, Switzerland, Nov. 30, 2009, pp. 24.
Murata, H., et.al., "32.2: A Real-Time 2-D to 3-D Image Conversion Technique Using Computer Image Depth", 1998 SID International Symposium Digest of Technical Papers, vol. 29, Issue 1, May 1998, pp. 919-923, [online], Internet URL: http://radioskot.ru/_fr/2/2Dto3D_conv32_0.pdf.
Ono S., et al., "Ubiquitous Technology: High-Efficiency Coding of Moving Images—MEPG-4 and H.265—," 1st edition, Apr. 20, 2005, Ohmsha, Ltd., pp. 124, 125, and 134-136, ISBN: 4-274-20060-4.
"Report on Research and Development for Image Production and Display Using Digital Techniques," Mar. 2008, Digital Content Association of Japan, pp. 60-66.
Sullivan G.J., et.al., "Draft AVC amendment text to specify Constrained Baseline profile, Stereo High profile, and frame packing SEI message", Jun. 28-Jul. 3, 2009, pp. 1-22, Joint Video Team (JVT) of ISO/IEC MPEG & ITU-T VCEG (ISO/IEC JTC1/SC29/WG11 and ITU-T SG16 Q.6), Document: JVT-AE204, Internet <URL: http://wftp3.itu.int/av-arch/jvt-site/2009_06_London/JVT-AE204.zip>.
Text of ISO/IEC FDIS 23002-3: "Representation of Auxiliary Video and Supplemental information," ISO/IEC JTC1/SC29/WG11, MPEG Doc, N8768, Marrakech, Morocco, Jan. 2007, pp. 33.

* cited by examiner

PROVIDING FRAME PACKING TYPE INFORMATION FOR VIDEO CODING

This application is a divisional of U.S. patent application Ser. No. 13/082,051, filed Apr. 7, 2011, which claims the benefit of U.S. Provisional Application No. 61/366,436, filed Jul. 21, 2010, and U.S. Provisional Application No. 61/433,110, filed Jan. 14, 2011, each of which is hereby incorporated by reference in its entirety.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is described in JVT-AB204, "Joint Draft 8.0 on Multiview Video Coding," 28th JVT meeting, Hannover, Germany, July 2008, available at http://wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document integrates SVC and MVC in the AVC specification.

SUMMARY

In general, this disclosure describes techniques for providing frame packing type information for coded video data. In particular, these techniques include signaling frame packing type for packed video frames at a representation layer of the video data. Coded video data may include multiple layers of data, which may be hierarchically encapsulated. For example, two of the layers may be a representation layer that encapsulates a codec layer. The codec layer may include actual coded video samples, e.g., coded frames. The representation layer may encapsulate the codec layer, and further provide information describing the coded video samples. In accordance with the techniques of this disclosure, the representation layer may include information describing a frame packing type for packed frames of the codec layer. In addition, a video encoder may include information in the codec layer to indicate an aspect ratio for images in the packed frame.

In one example, a method of providing video data includes receiving a packed frame of video data, wherein the packed frame comprises two frames corresponding to different views of a scene for three-dimensional playback, and providing information at a representation layer to a client device, wherein the information indicates a frame packing arrangement for the packed frame.

In another example, an apparatus for providing video data includes a processing unit configured to receive a packed frame of video data, wherein the packed frame comprises two frames corresponding to different views of a scene for three-dimensional playback, and provide information at a representation layer to a client device, wherein the information indicates a frame packing arrangement for the packed frame.

In another example, an apparatus for providing video data includes means for receiving a packed frame of video data, wherein the packed frame comprises two frames corresponding to different views of a scene for three-dimensional playback, and means for providing information at a representation layer to a client device, wherein the information indicates a frame packing arrangement for the packed frame.

In another example, a computer program product includes a computer-readable storage medium comprises instructions that, when executed, cause a processor of a source device for providing video data to receive a packed frame of video data, wherein the packed frame comprises two frames corresponding to different views of a scene for three-dimensional playback, and provide information at a representation layer to a client device, wherein the information indicates a frame packing arrangement for the packed frame.

In another example, a method of receiving video data includes receiving information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determining, by a processing unit of a device, whether the device is capable of decoding and rendering the bitstream based on an analysis of the received information by the processing unit and decoding and rendering capabilities of the device, and retrieving the bitstream when the processing unit determines that the device is capable of decoding and rendering the bitstream.

In another example, an apparatus for receiving video data includes a processing unit configured to receive information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determine whether the apparatus is capable of decoding and rendering the bitstream based on an analysis of the received information and decoding and rendering capabilities of the device, and retrieve the bitstream when the processing unit determines that the device is capable of decoding and rendering the bitstream.

In another example, an apparatus for receiving video data includes means for receiving information indicative of whether a bitstream includes a packed frame of video data, wherein the packed frame comprises two frames corresponding to different views of a scene for three-dimensional playback, and wherein the information is present in a representation layer external to a codec layer of the bitstream, means for automatically determining whether the device is capable of decoding and rendering the bitstream based on an analysis of the received information by the processing unit and decoding and rendering capabilities of the device, and means for retrieving the bitstream when the processing unit determines that the device is capable of decoding and rendering the bitstream.

In another example, a computer program product includes a computer-readable storage medium comprises instructions that cause a processor of a destination device for receiving video data to receive information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determine whether the device is capable of decoding and rendering the bitstream based on an analysis of the received information by the processing unit and decoding and rendering capabilities of the device, and retrieve the bitstream when the processing unit determines that the device is capable of decoding and rendering the bitstream.

The details of one or more examples are set forth in the accompanying drawings and the description below. Other features, objects, and advantages will be apparent from the description and drawings, and from the claims.

DETAILED DESCRIPTION

Figure 1:
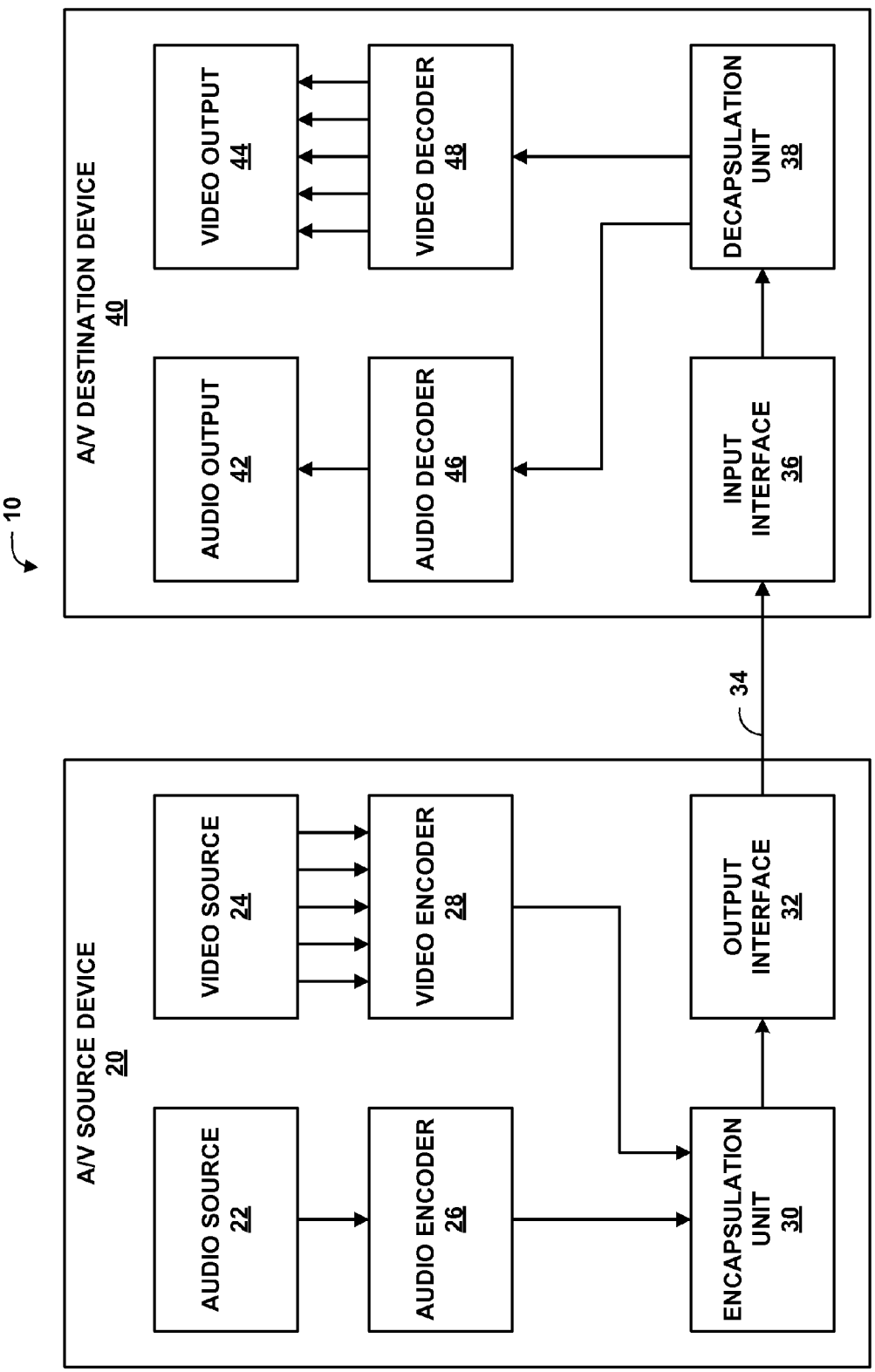
FIG. 1 is a block diagram illustrating an example system in which an audio/video (A/V) source device transfers audio and video data to an A/V destination device.

In general, this disclosure describes techniques for providing frame packing type information for coded video data. In particular, these techniques include signaling frame packing type for packed video frames at a representation layer of the video data. Coded video data may include multiple layers of data, which may be hierarchically encapsulated. For example, two of the layers may be a representation layer that encapsulates a codec layer. The codec layer may include actual coded video samples, e.g., coded frames. The representation layer may encapsulate the codec layer, and further provide information describing the coded video samples. In accordance with the techniques of this disclosure, the representation layer may include information describing a frame packing type for packed frames of the codec layer.

A packed frame may include data for two pictures from two different views of the same scene. For example, two different cameras may capture two pictures of the scene from different angles. As another example, one camera may capture one picture of a scene and a second picture from another angle may be generated, e.g., by a computer, based on depth information for objects in the scene. As still another example, both pictures may be generated, e.g., on the fly by a computer for computer graphics, video games, and the like.

Two pictures of the same scene may be used to produce a three-dimensional video representation of the scene during playback. For example, the two pictures may be displayed simultaneously or nearly simultaneously. An autostereoscopic display may display the two images to produce a three-dimensional video effect without the use of glasses or other eyewear by an observer. A stereoscopic display may be partnered with either active or passive glasses. Active glasses may be used to rapidly shutter the observer's left and right eyes in synchronization with the display, which may be configured to rapidly alternate between displaying left eye images and right eye images. Passive glasses may filter each image using, for example, color or polarization of light, while a corresponding display may present the two images simultaneously with different colors or polarization.

In accordance with the techniques of this disclosure, a representation of multimedia content may include packed frames of video data. A packed frame generally corresponds to a frame including data for two pictures of the same scene, where each of the two pictures are for the same temporal location for video playback. That is, the two pictures are intended to be displayed simultaneously or nearly simultaneously to produce a three-dimensional video effect. In other words, a first picture from a left eye view and a second picture from a right eye view may correspond to the same temporal location, and may be pictures of the same scene but from slightly different horizontal positions. A packed frame may include data for both the first picture and the second picture.

Packed frames can be arranged in a variety of different ways, referred to as frame packing arrangements. In general, a packed frame may include the same number of pixels as either of the left eye picture or the right eye picture. For example, suppose the left eye picture includes N×M pixels, where N and M are integers greater than zero. Likewise, the right eye picture may include N×M pixels. In some examples, the packed frame may include N×M pixels, with (N×M)/2 of the pixels from the left eye picture and (N×M)/2 of the pixels from the right eye picture.

The pixels selected for inclusion within the packed frame may vary based on frame packing type. For example, alternating rows or columns of pixels from the left and right eye pictures may be placed in the packed frame, and may be collocated with the pixels in the corresponding left and right eye pictures or rearranged within the packed frame. In some examples, quincunx (checkerboard) sampling may be used to select pixels from the left and right eye pictures, which again may be arranged in collocated positions with corresponding pixels of the left and right eye pictures or may be rearranged within the packed frame.

A video encoder may be configured to provide information at the codec level describing the frame packing type. In this manner, a video decoder may determine the frame packing type and, assuming the decoder supports the frame packing type, properly decode the packed frames. Moreover, the packed frames can also be properly unpacked using this information. The video decoder or a video post-processing unit may then form two separate pictures from the decoded packed frame, and also may upsample the pictures to their original resolution, e.g., N×M pixels.

In general, the techniques of this disclosure are directed to providing information describing a frame packing type for packed frames external to the codec layer, e.g., at the representation layer. For example, a source device may provide the information at the representation layer when sending data to a destination device in accordance with a streaming network protocol, such as streaming hypertext transfer protocol (streaming HTTP) in accordance with dynamic adaptive streaming over HTTP (DASH). In this manner, the source device may avoid sending, and the destination device may avoid requesting, video data including packed frames that the destination device is not configured to decode and/or render.

In some examples, the representation layer data may be provided by a data structure, such as a media presentation descriptor (MPD). The MPD may include information that describes various different representations of the same content. For example, some representations may include only two-dimensional video data, while others may include three-dimensional video data, e.g., two or more views. Some of the representations including there-dimensional video data may include packed frames. In accordance with the techniques of this disclosure, the MPD may provide an indication of whether each representation includes packed frames, and if so, a frame packing arrangement for the representation.

The destination device may be configured to request the MPD before requesting one of the representations. The destination device may then analyze the MPD to select an appropriate one of the representations. For example, if the destination device is configured to support packed frames with a particular frame packing arrangement, the destination device may determine which of the representations, if any, includes packed frames of that frame packing arrangement. If the destination device is not configured to support packed frames, then the destination device may determine which of the representations, if any, includes only two-dimensional video data. Alternatively, if the destination device can support three-dimensional video data but not packed frames (e.g., if the destination device supports multi-view video coding (MVC)), then the destination device may determine whether any of the representations includes three-dimensional video data but not using packed frames.

After selecting a representation, the destination device may begin requesting codec layer data of the selected representation. The codec layer data of the representation may include an additional indication of whether the data includes packed frames and/or a frame packing arrangement for the packed frames. A video decoder of the destination device may use this additional indication to determine how to decode the video data of the codec layer. Thus, for a representation including packed frames, there may be an indication at the representation layer that the destination device may use to select the representation, and in some examples, an additional indication for a video decoder to use during decoding of the video data. In this manner, the destination device may select an appropriate representation before requesting or receiving coded video samples of the representation. These techniques may therefore allow the destination device to avoid wasted bandwidth that may otherwise occur by requesting video data from a representation that the video decoder of the destination device cannot decode.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A presentation (motion sequence) may be contained in several files. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, vide, or timed text (e.g., for closed captioning). Media components may be time-continuous across boundaries of consecutive media segments within one representation.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder (not shown), also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the storage and transport of encoded multimedia (e.g., audio and video) data, and reception and subsequent interpretation and decoding of the transported multimedia data. As shown in the example of FIG. 1, video source 24 may provide a plurality of views of a scene to video encoder 28.

A/V source device 20 may provide a "service" to A/V destination device 40. A service generally corresponds to a subset of available views of MVC data. For example, MVC data may be available for eight views, ordered zero through seven. One service may correspond to stereo video having two views, while another service may correspond to four views, and still another service may correspond to all eight views. In accordance with the techniques of this disclosure, various services may include packed frames with different frame packing arrangements. In general, a service corresponds to any combination (that is, any subset) of the available views. A service may also correspond to a combination of available views as well as audio data. An operation point may correspond to a service, such that A/V source device 20 may further provide an operation point descriptor for each service provided by A/V source device 20.

Each individual stream of data (whether audio or video) is referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A "representation," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Encapsulation unit 30 is responsible for assembling elementary streams into a video file.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and supplemental enhancement information (SEI) NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

H.264/AVC supports interleaving of left view and right view pictures into one frame, and coding such frames into a video sequence. In H.264/AVC, a frame packing arrangement SEI message may be used to convey information on how the two pictures are packed into one frame. Such SEI messages form part of the codec layer data, intended to be received and interpreted by a video decoder. Therefore, to receive such messages, a video decoder must have access to codec layer data including the frame packing arrangement SEI messages. The frame packing arrangement SEI messages are described in Amendment 1 of the H.264/AVC standard, "Information technology—Coding of audio-visual objects—Part 10: Advanced Video Coding, AMENDMENT 1: Constrained baseline profile, stereo high profile and frame packing arrangement SEI message," N10703, MPEG of ISO/IEC JTC1/SC29/WG11, Xian, China, October 2009.

Figure 5:
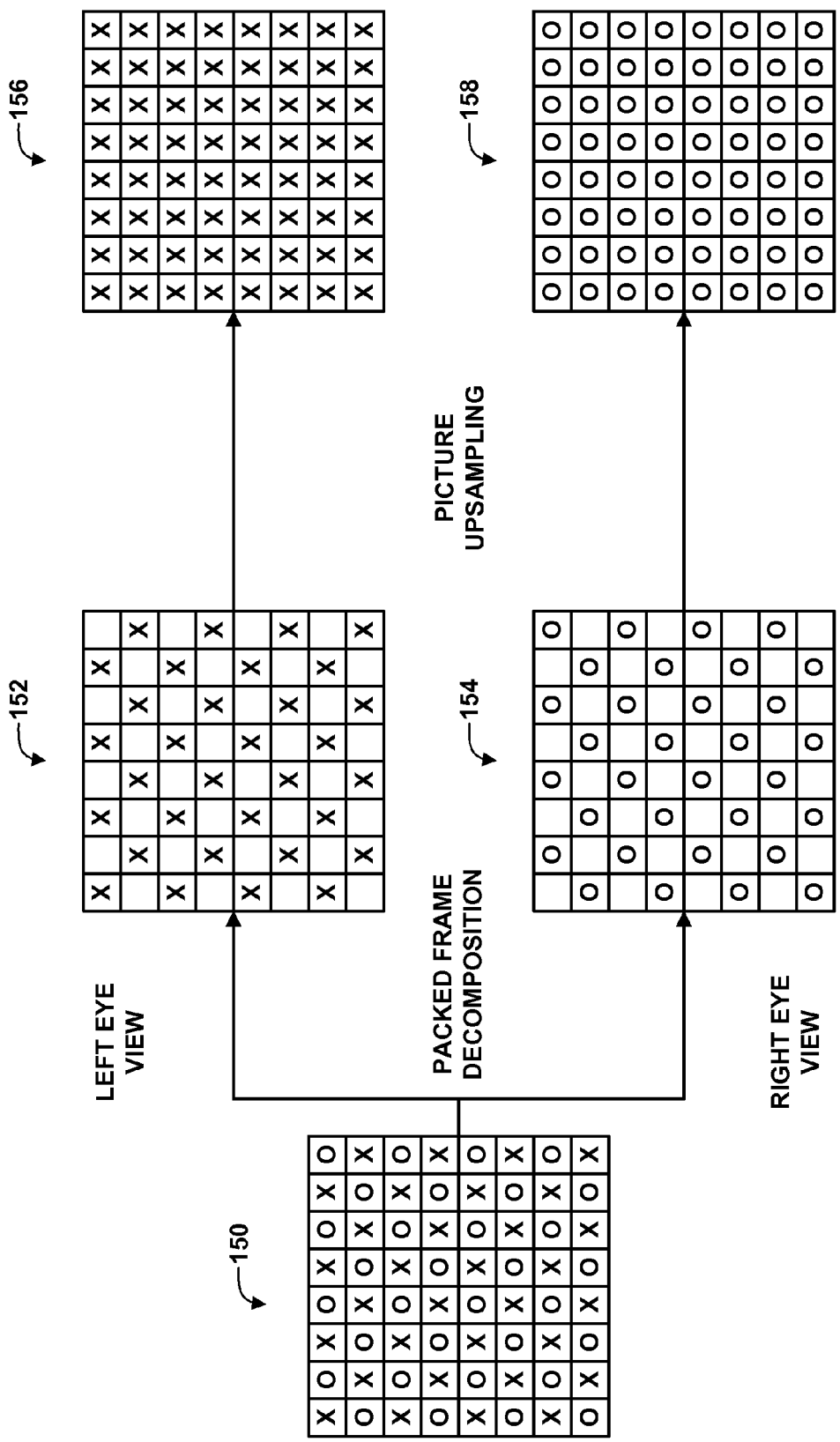
FIGS. 5-10 are conceptual diagrams illustrating various examples of frame packing arrangements for packed frames in accordance with the techniques of this disclosure.
Figure 6:
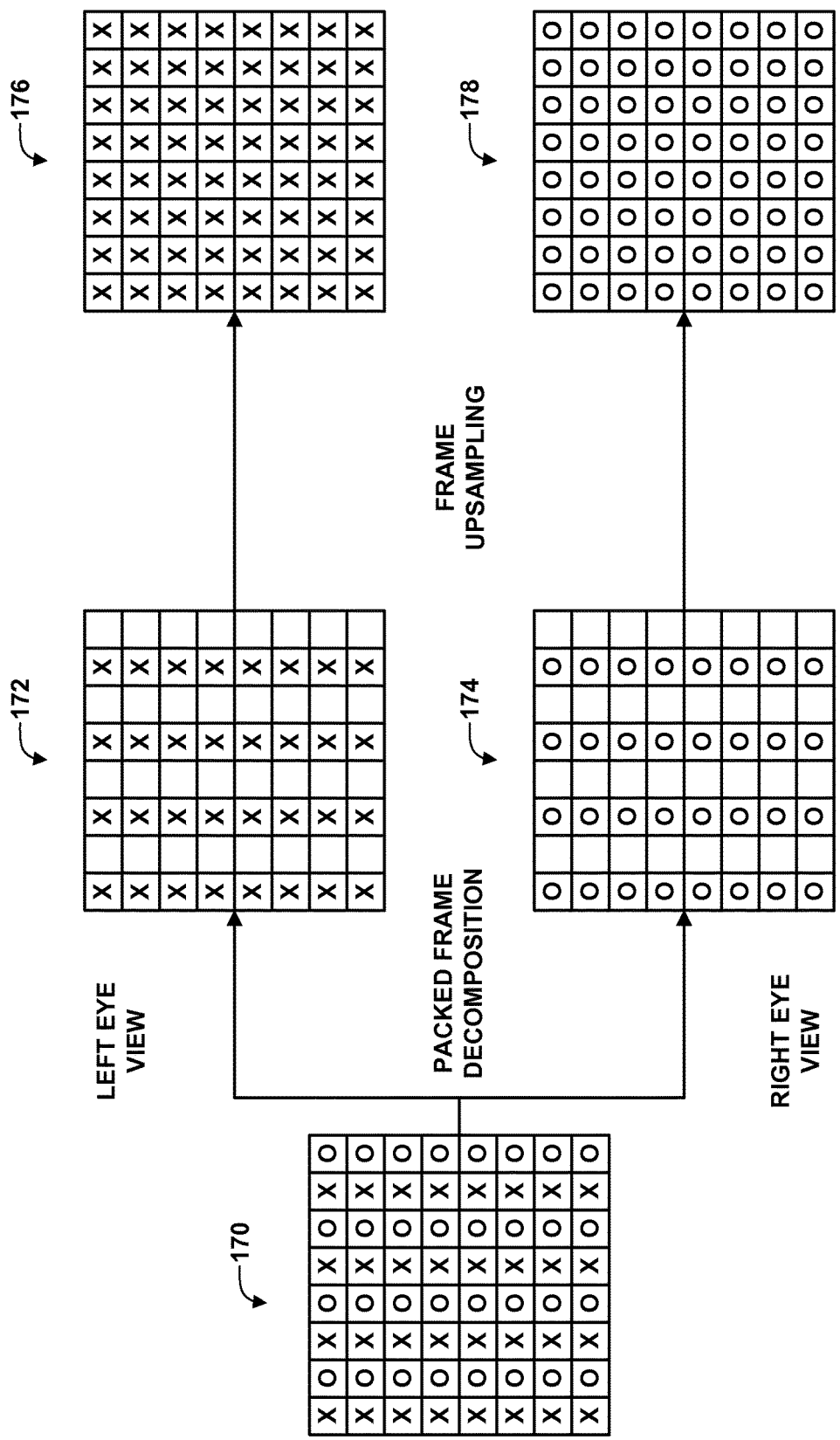
Figure 7:
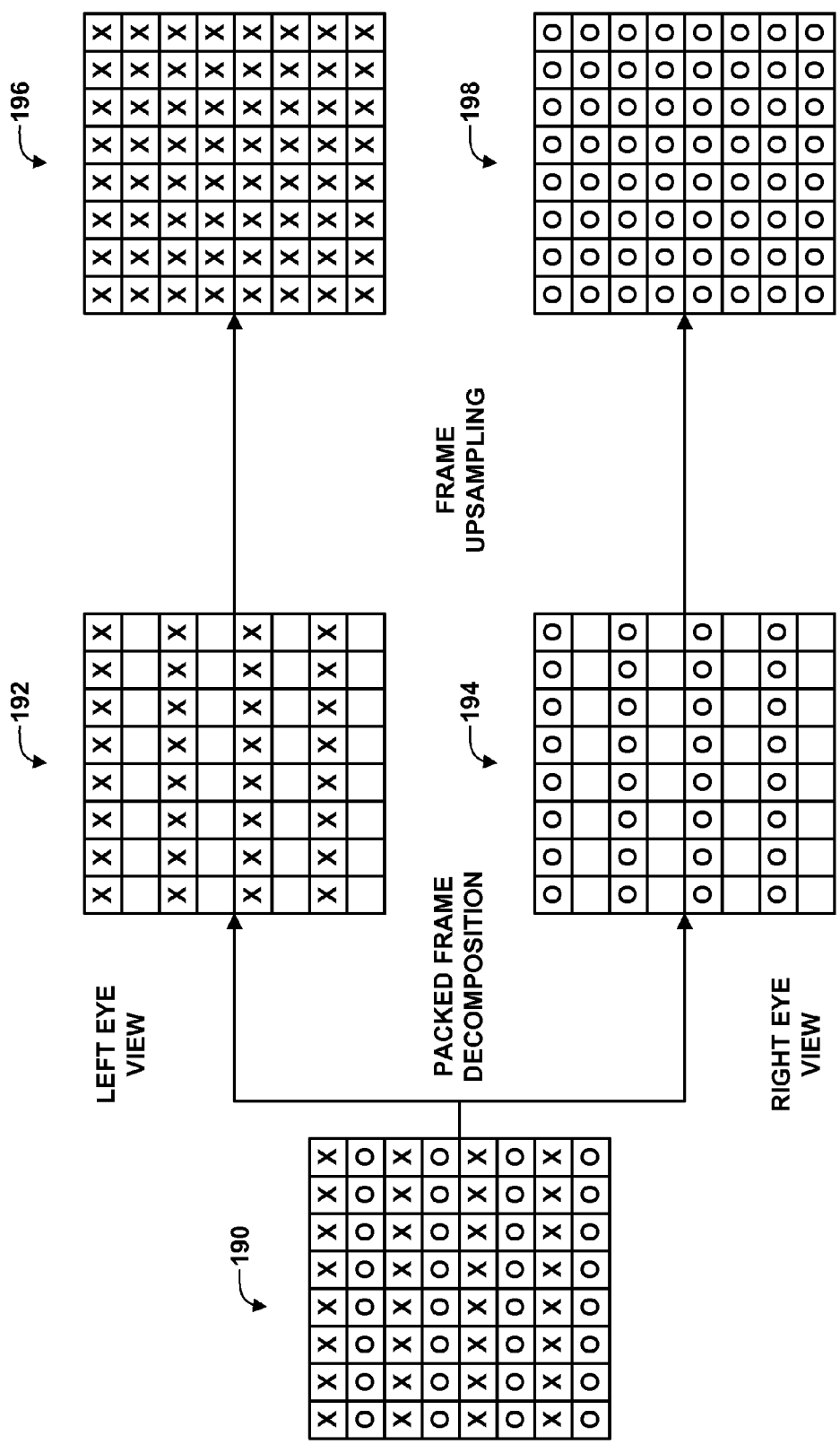
Figure 8:
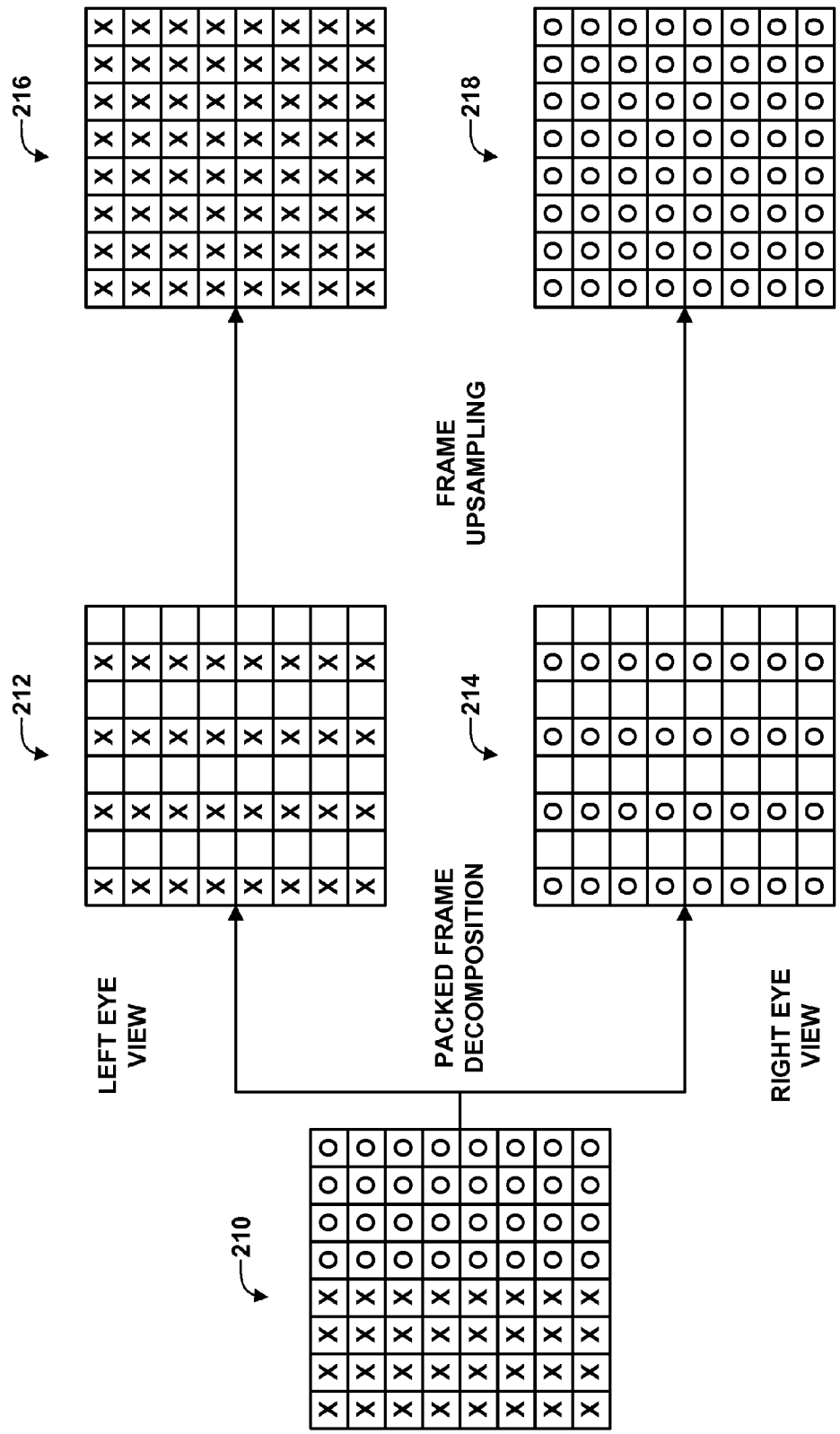
Figure 9:
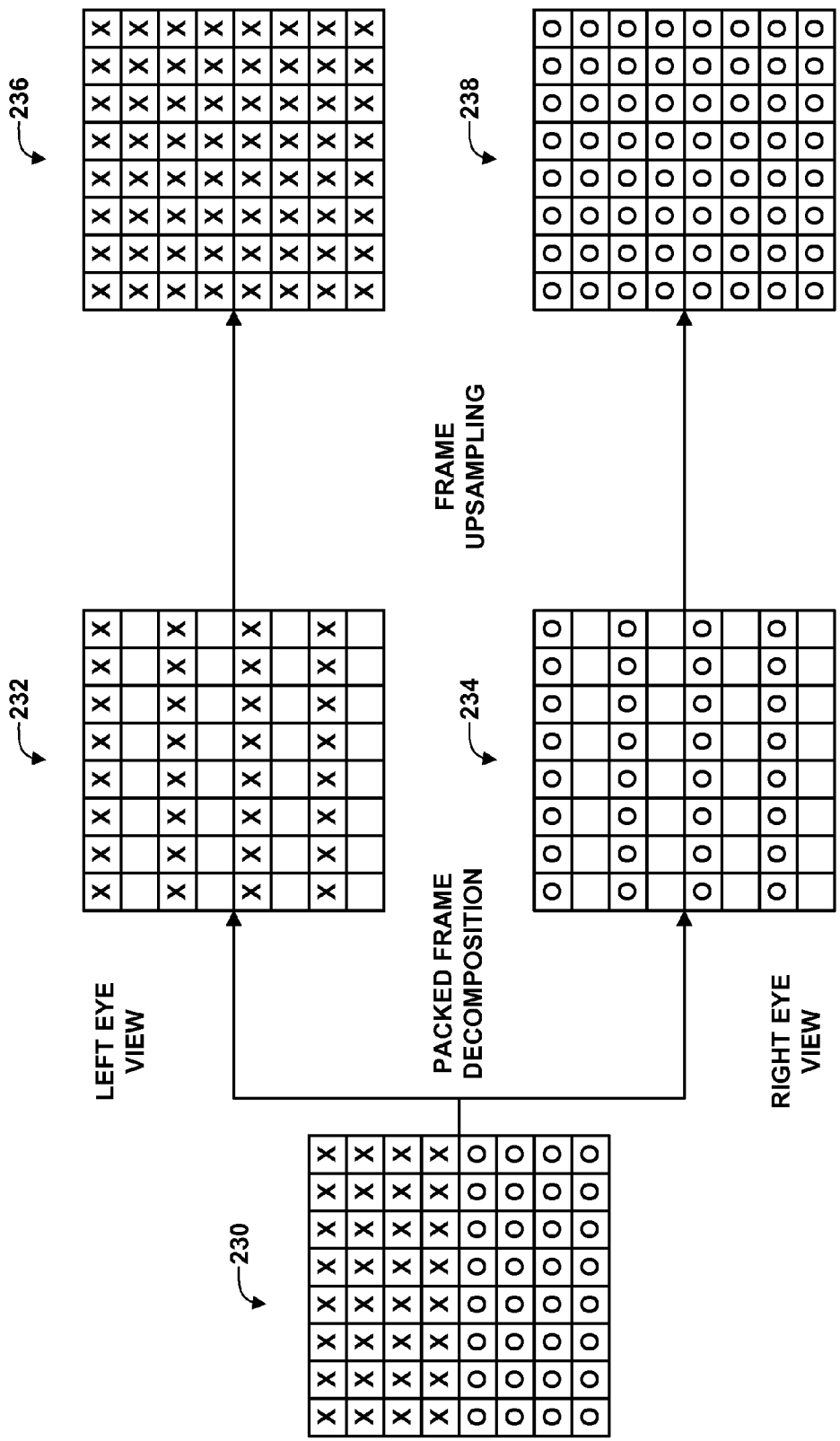
Figure 10:
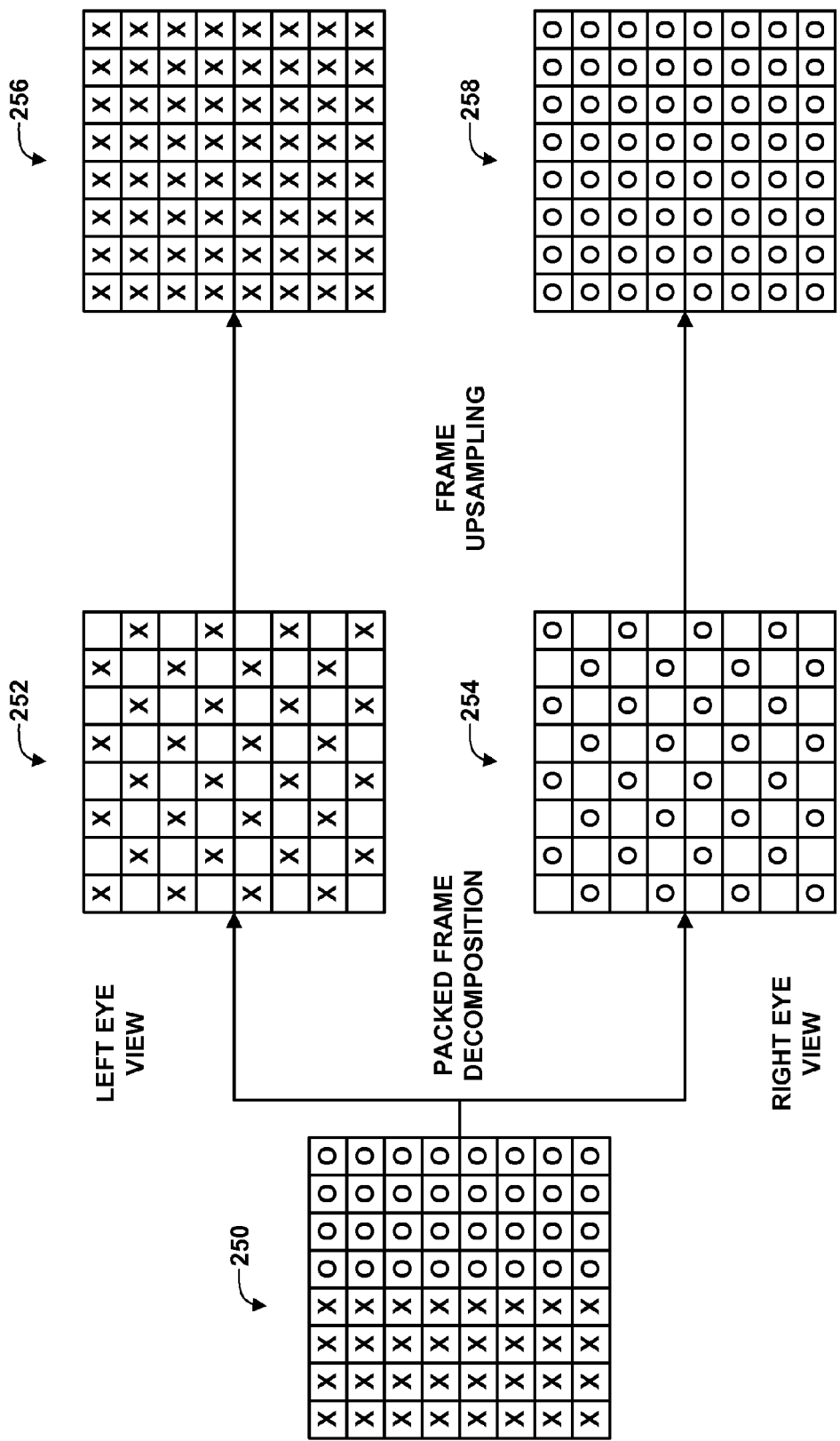

The frame packing arrangement SEI message may provide indications of various types of frame packing methods. H.264/AVC provides support for these various types of frame packing methods for spatially interleaving two pictures within a packed frame. The supported interleaving methods of H.264/AVC include checkerboard interleaving as shown in FIG. 5, column interleaving as shown in FIG. 6, row interleaving as shown in FIG. 7, side-by-side arrangement as shown in FIG. 8, top-bottom arrangement as shown in FIG. 9, and side-by-side with checkerboard upconversion as shown in FIG. 10. Other arrangements, sampling patterns, and upconversion methods can also be supported, e.g., by extending the frame packing arrangement SEI message.

In some examples, two pictures may be packed into a packed frame without sub-sampling. In such cases, information may be provided to indicate that no upconversion is necessary. For example, an aspect ration indicator (aspect_ratio_idc) included with Video Usability Information (VUI) may be set equal to 1:1 to indicate that upconversion is not necessary, as opposed to values of 2:1 or 1:2, which may indicate that upconversion is necessary.

In some examples, video file creation unit 60 may produce a frame packing arrangement SEI message for each representation. In addition, in some examples, the frame packing arrangement SEI message may include frame aspect ratios for each of the two images in the packed frame. Table 1 below provides an example of such a frame packing arrangement SEI message.

TABLE 1 frame_packing_arrangement SEI message

| frame_packing_arrangement( payloadSize ) { | C | Descriptor |
|---|---|---|
| frame_packing_arrangement_id | 5 | ue(v) |
| frame_packing_arrangement_cancel_flag | 5 | u(1) |
| if( !frame_packing_arrangement_cancel_flag ) { | | |
|   asymmetric_packing_idc | 5 | u(2) |
|   frame_packing_arrangement_type | 5 | u(5) |
|   quincunx_sampling_flag | 5 | u(1) |
|   content_interpretation_type | 5 | u(6) |
|   spatial_flipping_flag | 5 | u(1) |
|   frame0_flipped_flag | 5 | u(1) |
|   field_views_flag | 5 | u(1) |
|   current_frame_is_frame0_flag | 5 | u(1) |
|   frame0_self_contained_flag | 5 | u(1) |
|   frame1_self_contained_flag | 5 | u(1) |
|   frame0_aspect_ratio_idc | 5 | u(2) |
|   frame1_aspect_ratio_idc | 5 | u(2) |
|   If(!quincunx_sampling_flag && | | |
|     frame_packing_arrangement_type !=5 ) { | | |
|     frame0_grid_position_x | 5 | u(4) |
|     frame0_grid_position_y | 5 | u(4) |
|     frame1_grid_position_x | 5 | u(4) |
|     frame1_grid_position_y | 5 | u(4) |
|   } | | |
|   frame_packing_arrangement_reserved_byte | 5 | u(8) |
|   frame_packing_arrangement_repetition_period | 5 | ue(v) |
| } | | |
| frame_packing_arrangement_extension_flag | 5 | u(1) |
| } | | |

The frame packing arrangement SEI message may inform a video decoder, such as video decoder 48, that the output decoded picture contains samples of a frame including multiple distinct spatially packed constituent frames using an indicated frame packing arrangement scheme. In accordance with the techniques of this disclosure, the frame may comprise an asymmetric packed frame. The information of the SEI message can be used by the decoder to rearrange the samples and process the samples of the constituent frames appropriately for display or other purposes.

Video encoder 28 may set frame_packing_arrangement_id to a value containing an identifying number that may be used to identify the usage of the frame packing arrangement SEI message. Video encoder 28 may set value of frame_packing_arrangement_id in the range of 0 to $2^{32}-2$, inclusive. Values of frame_packing_arrangement_id from 0 to 255 and from 512 to $2^{31}-1$ may be used as determined by video encoder 28. Values of frame_packing_arrangement_id from 256 to 511 and from $2^{31}$ to $2^{32}-2$ may be reserved for future use by ITU-T|ISO/IEC. Video decoders may ignore (e.g., remove from the bitstream and discard) all frame packing arrangement SEI messages containing a value of frame_packing_arrangement_id in the range of 256 to 511 or in the range of $2^{31}$ to $2^{32}-2$.

Video encoder 28 may set the value of frame_packing_arrangement_cancel_flag equal to 1 to indicate that the frame packing arrangement SEI message cancels the persistence of any previous frame packing arrangement SEI message in output order. Video encoder 28 may set the value of frame- _packing_arrangement_cancel_flag equal to 0 to indicate that frame packing arrangement information follows.

In some examples, one view of the stereo content might be downsampled in either or both of the horizontal and/or vertical direction relative to the original content. Video encoder 28 may include an indicator in the codec layer (and/or the file container or transport layer) to indicate the aspect ratio for each of the stereo views. When the aspect ratio is 1:1, the sub-sampling (which could be either up-sampling and down-sampling) ratios in the horizontal direction and vertical direction are the same for a view. When the aspect ratio is 2:1 or 1:2, the sub-sampling ratios in these two directions are different. If the aspect ratio is 2:1 (or 1:2), different sub-sampling ratios are needed for the final rendering. Assume for example that the sub-sampling ratio is r in the horizontal direction; then the sub-sampling ratio is 2*r (or r/2) in the vertical direction. When the aspect ratio is 1:1 for one view while 2:1 or 1:2 for the other, the stereo video content is packed in an asymmetric manner, meaning that one view has one-half of the spatial resolution of the other view in the packed frame.

Video encoder 28 may signal the aspect ratio in the frame packing arrangement SEI message, in some examples. In other examples, video encoder 28 may include the aspect ratio indicator(s) in the ISO base media file format, in MPEG-2 Systems Program Stream or Transport Stream data, or in Dynamic Adaptive Streaming over HTTP (DASH).

Video encoder 28 may set values for frame0_aspect_ratio_idc and frame 1_aspect_ratio_idc to indicate the aspect ratio of view 0 and view 1. View 0 and view 1 may correspond, respectively, to the two images included in a packed frame. One example of the possible values of frame0_aspect_ratio_idc and frame1_aspect_ratio_idc are listed in Table 2. The aspect ratios for left view and right view might be the same in the symmetric case, wherein two views have the same resolution. So video encoder 28 may signal an aspect_ratio_idc, with similar semantics as listed in Table 2.

Video encoder 28 may place the indication of aspect ratios in any video file format container, e.g., ISO base media file format and its extensions, MPEG-2 Systems Transport Stream (TS), MPEG-2 Program Stream (PS), or header information of any delivery format used for transport, e.g., MPEG-2 TS, or HTTP streaming format, as part of the manifest.

TABLE 2 frame0_aspect_ratio_idc (or frame1_aspect_ratio_idc)

Value Example Interpretation

0   The aspect ratio is 1:1
1   The aspect ratio is 2:1; the proper representation of frame 0 picture (frame 1 picture) as a 2D image require the picture be upsampled in the horizontal direction with a factor of 2 relatively to the factor used in the vertical direction.
2   The aspect ratio is 1:2; the proper representation of frame 0 picture (frame 1 picture) as a 2D image require the picture be upsampled in the vertical direction with a factor of 2 relatively to the factor used in the horizontal direction.
3   Not-specified.

Video encoder 28 may set the value of quincunx_sampling_flag equal to 1 to indicate that each color component plane of each constituent frame is quincunx sampled. Video encoder 28 may set the value of quincunx_sampling_flag equal to 0 to indicate that the color component planes of each constituent frame are not quincunx sampled. When video encoder 28 sets the value of frame_packing_arrangement_type is equal to 0, video encoder 28 may also set the value of quincunx_sampling_flag equal to 1. When video encoder 28 sets the value of frame_packing_arrangement_type equal to 5, video encoder 28 may also set the value of quincunx_sampling_flag equal to 0.

Video encoder 28 may set the value of content_interpretation_type to indicate the intended interpretation of the constituent frames as specified in Table 4. Values of content_interpretation_type that do not appear in Table 4 may be reserved for future specification by ITU-T|ISO/IEC. For each specified frame packing arrangement scheme, there may be two constituent frames (pictures), referred to in Table 4 as frame 0 and frame 1.

TABLE 3 content_interpretation_type

Value Example Interpretation

0   Unspecified relationship between the frame packed constituent frames
1   Indicates that the two constituent frames form the left and right views of a stereo view scene, with frame 0 being associated with the left view and frame 1 being associated with the right view
2   Indicates that the two constituent frames form the right and left views of a stereo view scene, with frame 0 being associated with the right view and frame 1 being associated with the left view Video encoder 28 may set the value of spatial_flipping_flag equal to 1 when the value of frame_packing_arrangement_type is equal to 3 or 4, to indicate that one of the two constituent frames is spatially flipped relative to its intended orientation for display or other such purposes. When frame_packing_arrangement_type is equal to 3 or 4 and spatial_flipping_flag is equal to 1, the type of spatial flipping that is indicated may be as follows. If frame_packing_arrangement_type is equal to 3, the indicated spatial flipping is horizontal flipping. Otherwise (that is, when the value of frame_packing_arrangement_type is equal to 4), the indicated spatial flipping is vertical flipping.

When frame_packing_arrangement_type is not equal to 3 or 4, video encoder 28 may set the value of spatial_flipping_flag equal to 0. When frame_packing_arrangement_type is not equal to 3 or 4, the value 1 for frame_packing_arrangement_type may be reserved for future use by ITU-T|ISO/IEC. When frame_packing_arrangement_type is not equal to 3 or 4, video decoders may ignore the value 1 for spatial_flipping_flag.

Video encoder 28 may set the value of frame0_flipped_flag equal to 1 to indicate which one of the two constituent frames is flipped. When spatial_flipping_flag is equal to 1, video encoder 28 may set the value of frame0_flipped_flag equal to 0 to indicate that frame 0 is not spatially flipped and frame 1 is spatially flipped, or video encoder 28 may set the value of frame0_flipped_flag equal to 1 to indicate that frame 0 is spatially flipped and frame 1 is not spatially flipped.

When video encoder 28 sets the value of spatial_flipping_flag equal to 0, video encoder 28 may set the value of frame0_flipped_flag equal to 0. When video encoder 28 sets the value of spatial_flipping_flag is equal to 0, the value 1 for spatial_flipping_flag may be reserved for future use by ITU-T|ISO/IEC. When spatial_flipping_flag is equal to 0, video decoders may ignore the value of frame0_flipped_flag.

When video encoder 28 sets the value of quincunx_sampling_flag equal to 0, video encoder 28 may provide spatial location reference information to specify the location of the upper left luma sample of each constituent frame relative to a spatial reference point. Video encoder 28 may indicate the location of chroma samples relative to luma samples by the chroma_sample_loc_type_top_field and chroma_sample_loc_type_bottom_field syntax elements in video usability information (VUI) parameters.

Video encoder 28 may set the value of field_views_flag equal to 1 to indicate that all pictures in the current coded video sequence are coded as complementary field pairs. All fields of a particular parity may be considered a first constituent frame and all fields of the opposite parity may be considered a second constituent frame. When video encoder 28 does not set the value of frame_packing_arrangement_type equal to 2, video encoder 28 may set the value of field_views_flag equal to 0. When video encoder 28 does not set the value of frame_packing_arrangement_type equal to 2, the value 1 for field_views_flag may be reserved for future use by ITU-T|ISO/IEC. When frame_packing_arrangement_type is not equal to 2, video decoders may ignore the value of field_views_flag.

Video encoder 28 may set the value of current_frame_is_frame0_flag equal to 1, when frame_packing_arrangement is equal to 5, to indicate that the current decoded frame is constituent frame 0 and the next decoded frame in output order is constituent frame 1, and the display time of the constituent frame 0 should be delayed to coincide with the display time of constituent frame 1. Accordingly, a video decoder, such as video decoder 48, may delay the display time of constituent frame 0 to coincide with the display time of constituent frame 1. Video encoder 28 may set the value of current_frame_is_frame0_flag equal to 0, when frame_packing_arrangement is equal to 5, to indicate that the current decoded frame is constituent frame 1 and the previous decoded frame in output order is constituent frame 0, and the display time of the constituent frame 1 should not be delayed for purposes of stereo-view pairing. Accordingly, a video decoder, such as video decoder 48, need not delay the display time of constituent frame 1 when the value of current_frame_is_frame0_flag is equal to 0.

When video encoder 28 does not set the value of frame_packing_arrangement_type equal to 5, the constituent frame associated with the upper-left sample of the decoded frame may be considered to be constituent frame 0 and the other constituent frame may be considered to be constituent frame 1. When frame_packing_arrangement_type is not equal to 5, video encoder 28 may set the value of current_frame_is_frame0_flag equal to 0. When frame_packing_arrangement_type is not equal to 5, the value 1 for current_frame_is_frame0_flag may be reserved for future use by ITU-T|ISO/IEC. When frame_packing_arrangement_ type is not equal to 5, decoders may ignore the value of current_frame_is_frame0_flag.

Video encoder 28 may set the value of frame0_self_contained_flag equal to 1 to indicate that no inter prediction operations within the decoding process for the samples of constituent frame 0 of the coded video sequence refer to samples of any constituent frame 1. Video encoder 28 may set the value of frame0_self_contained_flag equal to 0 to indicate that some inter prediction operations within the decoding process for the samples of constituent frame 0 of the coded video sequence may or may not refer to samples of some constituent frame 1. When frame_packing_arrangement_type is equal to 0 or 1, video encoder 28 may set the value of frame0_self_contained_flag equal to 0. When frame_packing_arrangement_type is equal to 0 or 1, the value 1 for frame0_self_contained_flag may be reserved for future use by ITU-T|ISO/IEC. When frame_packing_arrangement_type is equal to 0 or 1, video decoders may ignore the value of frame0_self_contained_flag. Within a coded video sequence, video encoder 28 may set the value of frame0_self_contained_flag in all frame packing arrangement SEI messages to the same value.

Video encoder 28 may set the value of frame1_self_contained_flag equal to 1 to indicate that no inter prediction operations within the decoding process for the samples of constituent frame 1 of the coded video sequence refer to samples of any constituent frame 0. Video encoder 28 may set the value of frame1_self_contained_flag equal to 0 to indicate that some inter prediction operations within the decoding process for the samples of constituent frame 1 of the coded video sequence may or may not refer to samples of some constituent frame 0. When frame_packing_arrangement_type is equal to 0 or 1, it is a requirement of bitstream conformance that frame1_self_contained_flag shall be equal to 0. When frame_packing_arrangement_type is equal to 0 or 1, the value 1 for frame1_self_contained_flag may be reserved for future use by ITU-T|ISO/IEC. When frame_packing_arrangement_type is equal to 0 or 1, video decoders may ignore the value of frame1_self_contained_flag. Within a coded video sequence, video encoder 28 may set the value of frame1_self_contained_flag in all frame packing arrangement SEI messages to the same value.

When frame0_self_contained_flag is equal to 1 or frame1_self_contained_flag is equal to 1, and frame_packing_arrangement_type is equal to 2, the decoded frame may be a non-macroblock-level adaptive frame/field (MBAFF) frame.

In some examples, video encoder 28 may set both the value of frame0_self_contained_flag equal to 1 and frame1_self_contained_flag equal to 1. In this manner, video encoder 28 may signal that the respective views can be decoded and rendered separately.

Video encoder 28 may set the value of frame0_grid_position_x (when present) to specify the horizontal location of the upper left sample of constituent frame 0 to the right of the spatial reference point in units of one sixteenth of the luma sample grid spacing between the samples of the columns of constituent frame 0 that are present in the decoded frame (prior to any upsampling for display or other purposes).

Video encoder 28 may set the value of frame0_grid_position_y (when present) to specify the vertical location of the upper left sample of constituent frame 0 below the spatial reference point in units of one sixteenth of the luma sample grid spacing between the samples of the rows of constituent frame 0 that are present in the decoded frame (prior to any upsampling for display or other purposes).

Video encoder 28 may set the value of frame1_grid_position_x (when present) specifies the horizontal location of the upper left sample of constituent frame 1 to the right of the spatial reference point in units of one sixteenth of the luma sample grid spacing between the samples of the columns of constituent frame 1 that are present in the decoded frame (prior to any upsampling for display or other purposes)

Video encoder 28 may set the value of frame1_grid_position_y (when present) specifies the vertical location of the upper left sample of constituent frame 1 below the spatial reference point in units of one sixteenth of the luma sample grid spacing between the samples of the rows of constituent frame 1 that are present in the decoded frame (prior to any upsampling for display or other purposes).

Frame_packing_arrangement_reserved_byte may be reserved for future use by ITU-T|ISO/IEC. Video encoder 28 may set the value of frame_packing_arrangement_reserved_byte equal to 0. All other values of frame_packing_arrangement_reserved_byte may be reserved for future use by ITU-T|ISO/IEC. Video decoders may ignore (e.g., remove from the bitstream and discard) the value of frame_packing_arrangement_reserved_byte.

Video encoder 28 may set the value of frame_packing_arrangement_repetition_period to specify the persistence of the frame packing arrangement SEI message, which may specify a frame order count interval within which another frame packing arrangement SEI message with the same value of frame_packing_arrangement_id or the end of the coded video sequence video encoder 28 has made present in the bitstream. Video encoder 28 may set the value of frame_packing_arrangement_repetition_period in the range of 0 to 16,384, inclusive.

Video encoder 28 may set the value of frame_packing_arrangement_repetition_period equal to 0 to specify that the frame packing arrangement SEI message applies to the current decoded frame only. Video encoder 28 may set the value of frame_packing_arrangement_repetition_period equal to 1 to specify that the frame packing arrangement SEI message persists in output order until any of the following conditions are true: a new coded video sequence begins, or a frame in an access unit containing a frame packing arrangement SEI message with the same value of frame_packing_arrangement_id is output having PicOrderCnt( ) greater than PicOrderCnt(CurrPic).

Video encoder 28 may set the value of frame_packing_arrangement_repetition_period equal to 0 or equal to 1 to indicate that another frame packing arrangement SEI message with the same value of frame_packing_arrangement_id may or may not be present. Video encoder 28 may set the value of frame_packing_arrangement_repetition_period greater than 1 to specify that the frame packing arrangement SEI message persists until any of the following conditions are true: a new coded video sequence begins, or a frame in an access unit containing a frame packing arrangement SEI message with the same value of frame_packing_arrangement_id is output having PicOrderCnt( ) greater than PicOrderCnt(CurrPic) and less than or equal to PicOrderCnt(CurrPic)+frame_packing_arrangement_repetition_period.

Video encoder 28 may set the value of frame_packing_arrangement_repetition_period greater than 1 to indicate that another frame packing arrangement SEI message with the same value of frame_packing_arrangement_frames_id is present for a frame in an access unit that is output having PicOrderCnt( ) greater than PicOrderCnt(CurrPic) and less than or equal to PicOrderCnt(CurrPic)+frame_packing_arrangement_repetition_period, unless the bitstream ends or a new coded video sequence begins without output of such a frame.

Video encoder 28 may set the value of frame_packing_arrangement_extension_flag equal to 0 to indicate that no additional data follows within the frame packing arrangement SEI message. In this case, video encoder 28 may set the value of frame_packing_arrangement_extension_flag equal to 0. The value 1 for frame_packing_arrangement_extension_flag may be reserved for future use by ITU-T|ISO/IEC. Video decoders may ignore the value 1 for frame_packing_arrangement_extension_flag in a frame packing arrangement SEI message and may ignore all data that follows within a frame packing arrangement SEI message after the value 1 for frame_packing_arrangement_extension_flag.

In this manner, video encoder 28 may provide a frame packing arrangement SEI message that indicates a frame packing arrangement of packed frames at the codec layer. Furthermore, as discussed above, the frame packing arrangement SEI message may provide aspect ratio indicators for each image in the packed frame. In addition, in accordance with the techniques of this disclosure, encapsulation unit 30 may provide frame packing information at a representation layer of a bitstream. Encapsulation unit 30 may provide an indication at the representation layer (e.g., within a media presentation description (MPD)) of whether a particular representation includes three-dimensional video data, e.g., two or more views of the same scene. When a representation includes three-dimensional video data, encapsulation unit 30 may additionally provide an indication of whether the representation includes packed frames, and if so, a frame packing arrangement for the packed frames. Because this information is provided at the representation layer, destination device 40 may determine whether destination device 40 is capable of decoding and rendering the representation without actually retrieving coded video samples from the representation.

Destination device 40 may have particular decoding and rendering capabilities. For example, video decoder 48 may be capable of decoding all packed frames, only certain types of packed frames, or may not support decoding of packed frames at all. Destination device 40 may be configured to select a representation of multimedia content to retrieve based on the decoding capabilities of video decoder 48. For example, if video decoder 48 is capable of decoding packed frames of any frame packing arrangement, destination device 40 may select any of the representations. If video decoder 48 is only capable of decoding packed frames of certain frame packing arrangements, destination device 40 may select a representation including packed frames of one of those supported types. If video decoder 48 is not capable of decoding packed frames at all, destination device 40 may select a representation that does not include packed frames, such as a representation with two encoded views or a representation with only one view, e.g., for two-dimensional video playback.

Video output 44 may also have certain playback capabilities. If video output 44 is only capable of displaying one view (e.g., only capable of displaying two-dimensional video data), destination device 40 may retrieve data for a representation including two-dimensional video data. On the other hand, if video output 44 is capable of three-dimensional video playback, destination device 40 may select a representation including two or more views, which may be formed as packed frames.

The decoding and rendering capabilities of destination device 40 may correspond to certain factors that destination device 40 analyzes when selecting a representation. Other factors may include, for example, a representation's image resolution (e.g., height and width), frame rate, bitrate, block size, coding unit depth, or other such factors. In some examples, destination device 40 may be configured to determine an amount of available network bandwidth when selecting a representation. For example, when the available bandwidth is relatively low, destination device 40 may select a representation with a relatively low bitrate, whereas when the available bandwidth is relatively high, destination device 40 may select a representation with a higher bitrate. Destination device 40 may be configured to switch between switchable representations as network conditions (such as available network bandwidth) change.

Encapsulation unit 30 may form NAL units comprising a header that identifies a representation to which the NAL belongs, as well as a payload, e.g., audio data, video data, or data that describes the representation to which the NAL unit corresponds. For example, in H.264/AVC, a NAL unit includes a 1-byte header and a payload of varying size.

A NAL unit including video data in its payload may comprise various granularity levels of video data. For example, a NAL unit may comprise a block of video data, a macroblock, a plurality of macroblocks, a slice of video data, or an entire frame of video data. Encapsulation unit 30 may receive encoded video data from video encoder 28 in the form of PES packets of elementary streams. Encapsulation unit 30 may associate each elementary stream with a corresponding representation.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific pictures for all views of the same access unit (the same time instance) may be rendered simultaneously. In accordance with the techniques of this disclosure, an access unit may correspond to a packed frame including two pictures from two different views. In another example corresponding to H.264/AVC, an access unit may comprise one or more coded pictures in one time instance. In accordance with the techniques of this disclosure, an access unit may comprise a packed frame, which may include data for two images of a scene from different views of the scene at a particular temporal instance.

Accordingly, an access unit may comprise all audio and video frames of a common temporal instance, e.g., pictures for all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible that there may be a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks (also referred to as "coding units") that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. In H.264/AVC, SPS and PPS data is provided in the codec layer, such that a video encoder may form the SPS and PPS data and a video decoder may interpret the SPS and PPS data. The use of parameter sets may enable out-of-band transmission of header information, avoiding the need for redundant transmissions to achieve error resilience. In out-of-band transmission, parameter set NAL units are transmitted on a different channel than the other NAL units.

Multimedia content may include a media presentation description (MPD), which may contain descriptions of different alternative representations (e.g., video services with different qualities) and the description may include, e.g., codec information, a profile value, and a level value. Destination device 40 may retrieve the MPD of multimedia content to select one of the representations that is most appropriate for destination device 40 (e.g., that can be decoded and rendered by destination device 40), and to determine how to access movie fragments of the selected representation. Movie fragments may be located in movie fragment boxes (moof boxes) of video files. In accordance with the techniques of this disclosure, the MPD may include data describing a frame packing arrangement for each representation of the multimedia content.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination may be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra- (I), or inter- (P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, and/or decapsulation unit 38 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, source device 20 represents an example of an apparatus for providing video data, the apparatus comprising a processing unit configured to receive a packed frame of video data, wherein the packed frame comprises two frames corresponding to different views of a scene for three-dimensional playback, and provide information at a representation layer to a client device, wherein the information indicates a frame packing arrangement for the packed frame. Likewise, destination device 40 represents an example of an apparatus for retrieving video data, the apparatus comprising a processing unit configured to receive information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determine whether the apparatus is capable of decoding and rendering the bitstream based on an analysis of the received information and decoding and rendering capabilities of the device, and retrieve the bitstream when the processing unit determines that the device is capable of decoding and rendering the bitstream.

Figure 2:
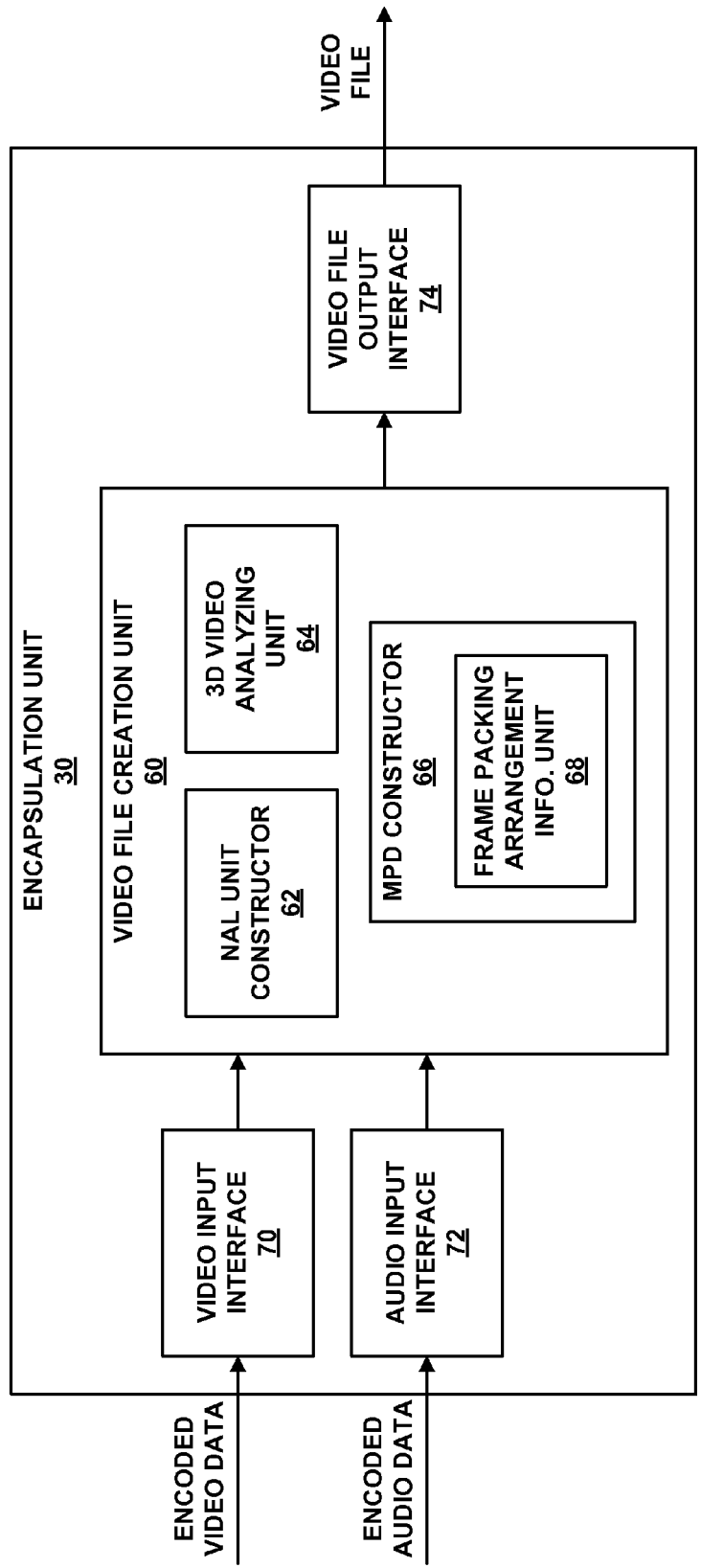
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 70, audio input interface 72, video file creation unit 60, and video file output interface 74. Video file creation unit 60, in this example, includes NAL unit constructor 62, 3D video analyzing unit 64, MPD constructor 66, and frame packing arrangement information unit 68.

Video input interface 70 and audio input interface 72 receive encoded video and audio data, respectively. Video input interface 70 and audio input interface 72 may receive encoded video and audio data as the data is encoded, or may retrieve encoded video and audio data from a computer-readable medium. Upon receiving encoded video and audio data, video input interface 70 and audio input interface 72 pass the encoded video and audio data to video file creation unit 60 for assembly into a video file.

Video file creation unit 60 may correspond to a control unit including hardware, software, and/or firmware configured to perform the functions and procedures attributed thereto. The control unit may further perform the functions attributed to encapsulation unit 30 generally. For examples in which video file creation unit 60 is embodied in software and/or firmware, encapsulation unit 30 may include a computer-readable medium comprising instructions for video file creation unit 60 and a processing unit to execute the instructions. Each of the sub-units of video file creation unit 60 (NAL unit constructor 62, 3D video analyzing unit 64, MPD constructor 66, and frame packing arrangement information unit 68, in this example) may be implemented as individual hardware units and/or software modules, and may be functionally integrated or further separated into additional sub-units.

Video file creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 60 may further include a non-transitory computer-readable medium storing instructions for any or all of NAL unit constructor 62, 3D video analyzing unit 64, MPD constructor 66, and frame packing arrangement information unit 68, as well as one or more processors for executing the instructions.

In general, video file creation unit 60 may create a video file including the received audio and video data. NAL unit constructor 62 may form NAL units including encoded video and audio samples. In some examples, each video sample may correspond to a packed frame, where the packed frame may include data for two images of the same scene at a common temporal instance. In some examples, the two images may have one-half of the resolution of their original counterpart images, and the packed frame may have the same resolution as the original counterpart images.

Video file creation unit 60 may further be configured to produce information indicating whether a representation (which may correspond to one or more video files) includes three-dimensional video data. When a representation includes three-dimensional video data, video file creation unit 60 may produce information indicating whether the representation includes packed frames, and if so, a frame packing arrangement for the packed frames.

For example, 3D video analyzing unit 64 may determine whether encoded video samples for a representation include three-dimensional video data. In some examples, video encoder 28 may send data to encapsulation unit 30 indicating whether encoded video data for a representation includes three-dimensional video data, packed frames, and frame packing arrangements for packed frames. In other examples, 3D video analyzing unit 64 may inspect codec layer data for a representation, e.g., frame packing arrangement SEI messages, to determine whether the codec layer data includes three-dimensional video data, packed frames, and frame packing arrangements for packed frames.

MPD constructor 66 may construct an MPD data structure for one or more representations of multimedia content. The MPD may indicate, for each of the representations, whether the representation includes three-dimensional video data, packed frames, and frame packing arrangements for packed frames. Table 4 below provides an example MPD data structure in accordance with the techniques of this disclosure. The MPD of Table 4 is an example in which video file creation unit 60 signals information at the representation layer.

The "Element or Attribute Name" column describes the name of the syntax object. The "Type" column describes whether the syntax object is an element or an attribute. The "Cardinality" column describes the cardinality of the syntax object, that is, the number of instances of the syntax object in an instance of a data structure corresponding to Table 4. The "Optionality" column describes whether the syntax object is optional, in this example, where "M" indicates mandatory, "O" indicates optional, "OD" indicates optional with a default value, and "CM" indicates conditionally mandatory. The "description" column describes the semantics of the corresponding syntax object.

TABLE 4

Example Media Presentation Description

| Element or Attribute Name | Type | Cardinality | Optionality | Description |
| --- | --- | --- | --- | --- |
| MPD | E | 1 | M | The root element that carries the Media Presentation Description for a Media Presentation. |
| type | A | | OD default: OnDemand | "OnDemand" or "Live". Indicates the type of the Media Presentation. Currently, on-demand and live types are defined. If not present, the type of the presentation shall be inferred as OnDemand. |
| ... | | | | |
| minBufferTime | A | | M | Provides the minimum amount of initially buffered media that is needed to ensure smooth playout provided that each Representation is delivered at or above the value of its bandwidth attribute. |
| ... | | | | |
| availabilityStartTime | A | | CM Must be present for type = "Live" | Gives the availability time (in UTC format) of the start of the first Period of the Media Presentation. |
| availabilityEndTime | A | | O | Gives the availability end time (in UTC format). After this time, the Media Presentation described in this MPD is no longer accessible. When not present, this value is unknown. |
| ... | | | | |
| baseURL | A | | O | Base URL on MPD level. |
| Period | E | 1...N | M | Provides the information of a Period |
| Start | A | | M | Provides the accurate start time of the Period relative to the value of the attribute availabilityStartTime of the Media Presentation |
| segmentAlignment Flag | A | | O Default: false | When True, indicates that all start and end times of media components of any particular media type are temporally aligned in all Segments across all Representations in this Period. |
| bitstreamSwitching Flag | A | | O Default: false | When True, indicates that the result of splicing on a bitstream level of any two time-sequential Media Segments within a Period from any two different Representations containing the same media types complies to the Media Segment format. |
| ... | | | | |
| Representation | E | 1...N | M | This element contains a description of a representation |
| bandwidth | A | | M | The minimum bandwidth of a hypothetical constant bitrate channel in bits per second (bps) over which the representation can be delivered such that a client, after buffering for exactly minBufferTime, |

TABLE 4-continued

Example Media Presentation Description

| Element or Attribute Name | Type | Cardinality | Optionality | Description |
| --- | --- | --- | --- | --- |
| | | | | can be assured of having enough data for continuous playout. |
| width | A | | O | Specifies the horizontal resolution of the video media type in an alternative Representation, in pixels |
| height | A | | O | Specifies the vertical resolution of the video media type in an alternative Representation, in pixels |
| 3D video | E | 0, 1 | O | Provides the information for 3D video in the representation |
| AVCFrame PackingType | A | 0, 1 | O | When present, indicates that the representation is an H.264/AVC bitstream with frame packing SEI, associated with a type of AVCFramePackingType [9]. |
| . . . | | | | |

MPD constructor 66 may construct an MPD similar to that shown in Table 1. In other examples, video file creation unit 60 may construct other data structures at the representation layer containing information similar to the MPD of Table 4. The information contained in the MPD may be generalized to other codecs, such as MPEG-2 or MPEG-4, part 2, in which a picture pair in two views is interleaved in one frame with various possible frame packing types. In general, the MPD corresponds to a particular multimedia content, and may include information representative of one or more representations for each period of the multimedia content.

In the example of Table 4, MPD constructor 66 may set a value for the MPD "type" to indicate whether the corresponding multimedia content is transmitted "OnDemand" or "Live". MPD constructor 66 may also set a value for minBufferTime to indicate an amount of data that a client should buffer to provide smooth playback. MPD constructor 66 may set values for availabilityStartTime and availabilityEndTime to indicate Coordinated Universal Time (UTC) times for the start and end times of periods for the multimedia content. MPD constructor 66 may also set a value for baseURL to indicate a URL for the multimedia content. In some examples, representations may be accessed by accessing the URL followed by a representation identifier. For example, the base URL may be "www.example.com" while each representation may be identified by "rep" and a uniquely identifying number, e.g., 1, 2, etc. Thus, to access the first representation, a URL of "www.example.com/rep1" may be used, to access the second representation, a URL of "www.example.com/rep2" may be used, and so on.

As discussed above, multimedia content may include one or more periods, each of which may include one or more representations. For each period, MPD constructor 66 may set a value for Start to indicate when the period begins, relative to the signaled availabilityStartTime. MPD constructor 66 may also set a value for segmentAlignmentFlag for each period to indicate whether start and end times of media components are temporally aligned in representations for the corresponding period. MPD constructor 66 may also set a value for bitstreamSwitchingFlag to indicate whether time sequential media segments within the period from two different representations having the same media type use the same media segment format.

For each representation, MPD constructor 66 may set a value for bandwidth to indicate the minimum bandwidth needed to ensure smooth playout of the corresponding representation. MPD constructor 66 may also set values for width and height to specify the horizontal and vertical resolutions, respectively, of the corresponding representation. In accordance with the techniques of this disclosure, MPD constructor 66 may include 3D video information in a constructed MPD. When a representation does not include 3D video, MPD constructor 66 may omit inclusion of this data for the representation. On the other hand, when a representation includes three-dimensional video data, e.g., in the form of packed frames, frame packing arrangement information unit 68 may set a value for AVCFramePackingType for the corresponding representation, to indicate how packed frames for the representation are arranged.

Figure 3:
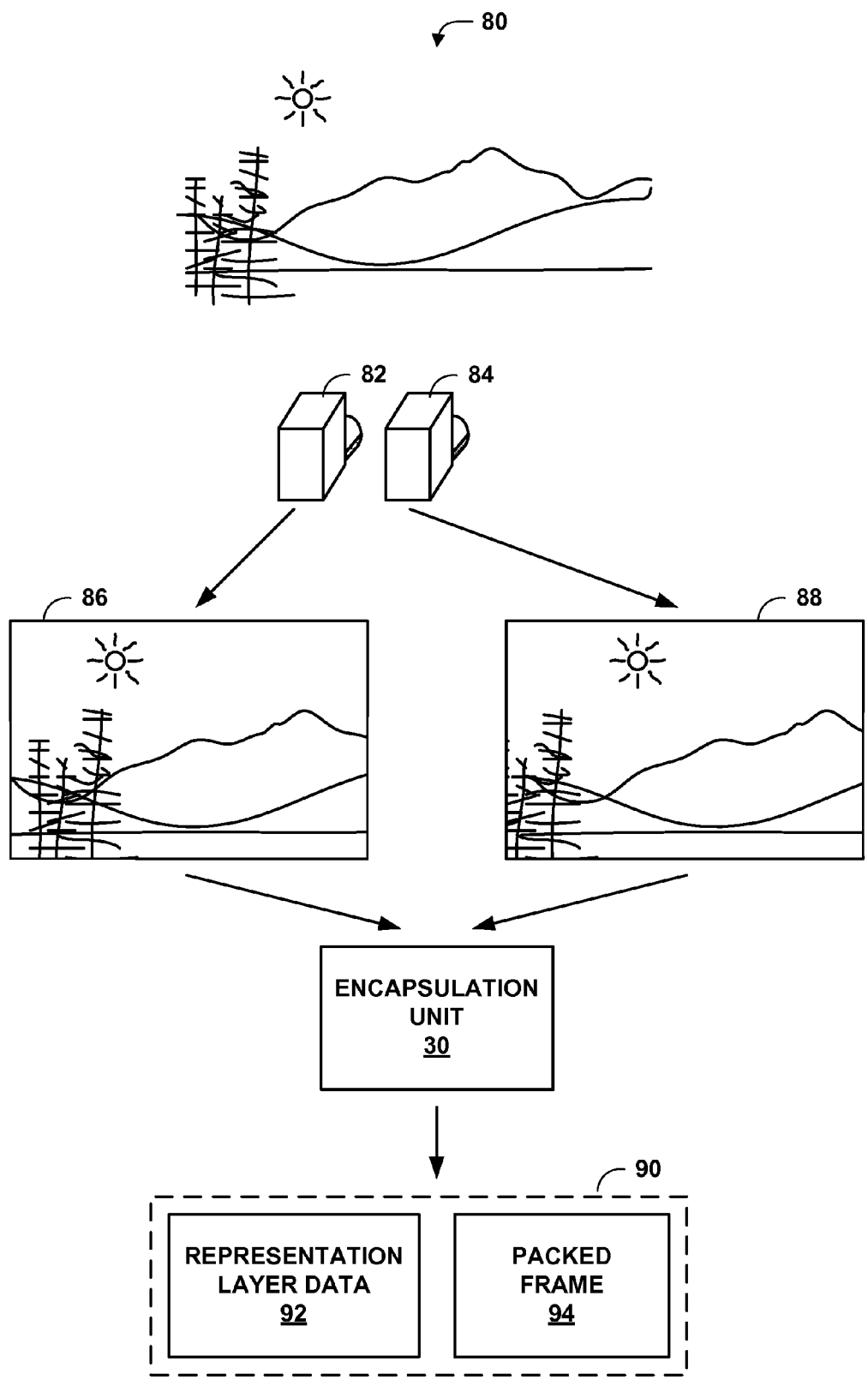
FIG. 3 is a conceptual diagram illustrating two pictures of the same scene and formed into a packed frame.

FIG. 3 is a conceptual diagram illustrating two pictures 86, 88 of the same scene 80 and formed into a packed frame 94. In the example of FIG. 3, two cameras 82, 84 capture images of scene 80 approximately simultaneously, in order to simulate binocular vision of the human visual system. Cameras 82, 84, may be mounted a short distance apart and be configured to achieve the same focal depth. In this manner, cameras 82, 84 may capture images 86, 88 nearly simultaneously, e.g., at the same temporal instance. Because of the distance between cameras 82, 84, there may be some horizontal disparity between objects in images 86 and 88, and the amount of disparity may differ based on whether the objects are in the foreground, the background, or at the focal depth.

Initially, images 86, 88 may be combined, e.g., by a preprocessing unit or by a video encoder, such as video encoder 28 (FIG. 1, not shown in FIG. 3). Video encoder 28 may form a packed frame including data for each of images

86, 88. In particular, video encoder 28 may subsample images 86, 88 to extract, e.g., one-half of the pixels from each of images 86, 88. Video encoder 28 may then combine the subsampled pixels from images 86, 88 to form a single, packed frame 94. Video encoder 28 may also encode packed frame 94.

Encapsulation unit 30 may receive packed frame 84 from video encoder 28. Encapsulation unit 30 may determine a frame packing arrangement for packed frame 94, e.g., using codec layer data from video encoder 28 or by receiving other information from video encoder 28, e.g., in an out-of-band communication. Based on the indicated frame packing arrangement for packed frame 94, encapsulation unit 30 may produce representation layer data 92 that describes the frame packing arrangement for packed frame 94. For example, encapsulation unit 30 may form an MPD including representation layer data 92. Together, representation layer data 92 and packed frame 94 may form part of multimedia content 90. Multimedia content 90 may include additional packed frames for the same representation and for additional representations, and in some examples, one or more representations that do not include packed frames.

Figure 4:
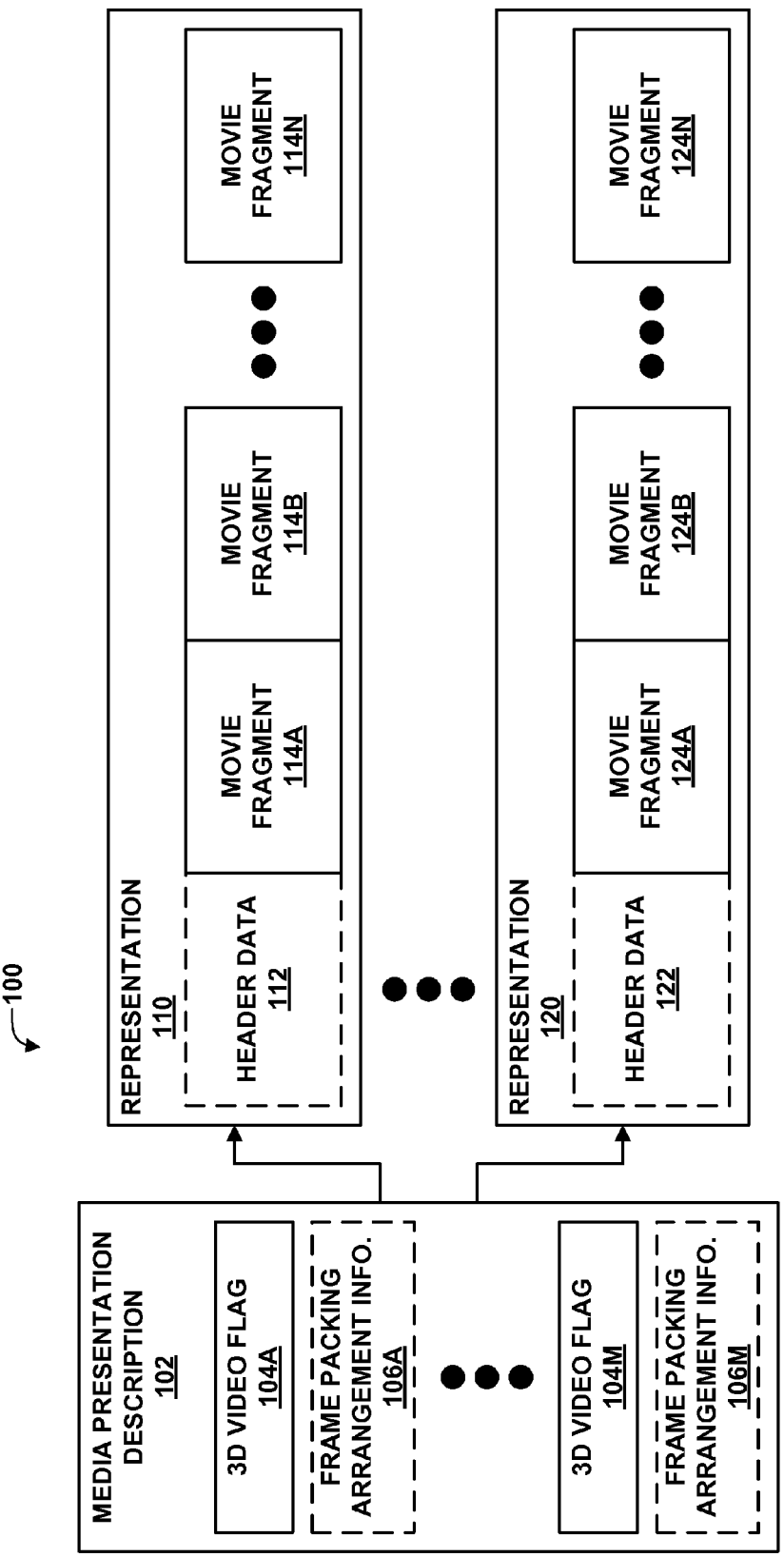
FIG. 4 is a conceptual diagram illustrating elements of an example multimedia content 100.

FIG. 4 is a conceptual diagram illustrating elements of an example multimedia content 100. In the example of FIG. 4, multimedia content 100 includes media presentation description (MPD) 102 and a plurality of representations 110-120. Representation 110 includes optional header data 112 and movie fragments 114A-114N (movie fragments 114), while representation 120 includes optional header data 122 and movie fragments 124A-124N (movie fragments 124). The letter N is used to designate the last movie fragment in each of representations 110, 120 as a matter of convenience. In some examples, there may be different numbers of movie fragments between representations 110, 120.

MPD 102 may comprise a data structure separate from representations 110-120. In the example of FIG. 4, MPD 102 includes 3D video flags 104A-104M (3D video flags 104) and optional frame packing arrangement information 106A-106M (frame packing arrangement information 106). 3D video flags 104 may each correspond to one of representations 110-120. 3D video flags 104 may have values indicating whether the corresponding one of representations 110-120 includes three-dimensional video data, e.g., two or more views, and potentially packed frames including data for images from two views.

Frame packing arrangement information 106 may be present for a representation when the corresponding one of 3D video flags 104 indicates that the representation includes three-dimensional video data. Frame packing arrangement information 106 need not necessarily be present for a representation when the corresponding one of video flags 104 indicates that the representation does not include three-dimensional data. When present, frame packing arrangement data 106 may describe a frame packing type for the corresponding representation. Each packed frame in the corresponding representation may thereby have the same frame packing type.

Header data 112, when present, may describe characteristics of movie fragments 114, e.g., temporal locations of random access points, which of movie fragments 114 includes random access points, byte offsets to random access points within movie fragments 114, uniform resource names (URNs) of movie fragments 114, or other aspects of movie fragments 114. Header data 122, when present, may describe similar characteristics for movie fragments 124. Alternatively, such characteristics may be fully included within MPD 102.

Movie fragments 114 include one or more coded video samples, each of which may include packed frames of video data. Each of the coded video samples of movie fragments 114 may have similar characteristics, e.g., height, width, bandwidth requirements, and, when including packed frames, frame packing arrangements. Such characteristics may be described by data of MPD 102, though such data is not illustrated in the example of FIG. 4. MPD 102 may include characteristics as described by the 3GPP Specification, with the addition of frame packing information for representations including packed frames, as described above with respect to the example of Table 4.

Each of movie fragments 114, 124 may be associated with a unique uniform resource identifier (URI), e.g., a uniform resource locator (URL) or uniform resource name (URN). Thus, each of movie fragments 114, 124 may be independently retrievable using a streaming network protocol, such as HTTP Streaming or DASH. In this manner, a destination device, such as destination device 40, may use an HTTP Get request to retrieve movie fragments 114 or 124. In some examples, destination device 40 may use HTTP partial Get requests to retrieve specific byte ranges of movie fragments 114 or 124.

In some examples, two representations of the same multimedia content may have packed frames of the same frame packing arrangement, but may differ in other characteristics. For example, frames of the representations may have different resolutions, frame rates, or bitrates. In such examples, destination device 40 may be configured with the ability to switch between the representations during retrieval and playback. For example, if initially destination device 40 selects one of the representations with a relatively high bitrate, but network conditions change such that bandwidth becomes less available, destination device 40 may begin retrieving movie fragments from a different representation with the same frame packing arrangement but with a relatively lower bitrate.

FIGS. 5-10 are conceptual diagrams illustrating various examples of frame packing arrangements for packed frames in accordance with the techniques of this disclosure. The process of subsampling and combining pixel data from two images to form a packed frame may generally be symmetrical to the process for unpacking and upsampling the packed frame to reproduce the original two images. Thus, although the examples of FIGS. 5-10 depict the process of rearranging and upconverting a packed frame to form two images, it should be understood that a similar process may be used to subsample and arrange data from two images to form a packed frame. In the examples of FIGS. 5-10, without loss of generality, X's represent pixel data for left eye view images, while O's represent pixel data for right eye view images. Moreover, the number of pixels illustrated in each frame is not necessarily equal (or proportional) to the actual number of pixels in a packed frame or an upconverted image. The illustrated number of pixels is intended only for purposes of explanation.

FIG. 5 illustrates an example of packed frame 150 having a checkerboard interleaving frame packing type. Pixels indicated with X's in packed frame 150 are collocated with their counterparts from the original left eye view image, while pixels indicated with O's in packed frame 150 are collocated with their counterparts from the original right eye view image. Thus, to unpack packed frame 150, video decoder 48 (FIG. 1) may form subsampled left eye image 152 by placing pixels indicated with X's from packed frame 150 in collocated positions within the image to be formed. Likewise, video decoder 48 may form subsampled right eye image 152 by placing pixels indicated with O's from packed frame 150 in collocated positions within the image to be formed.

After forming subsampled left eye image 152 and subsampled right eye image 154, video decoder 48 may upsample the images. For example, video decoder 48 may perform interpolation to fill in missing pixels (squares without an X or an O). Video decoder 48 may use any conventional interpolation process, e.g., bilinear filtering, to form upconverted pictures. Video decoder 48 may form upconverted left eye image 156 by interpolating subsampled left eye image 152 and upconverted right eye image 158 by interpolating subsampled right eye image 154.

In order to decode and rearrange packed frame 150, video decoder 48 may utilize a frame packing arrangement SEI message contained in the codec layer. For example, video decoder 48 may determine the frame packing arrangement using this frame packing arrangement SEI message. In this example, the frame packing arrangement SEI message may indicate that packed frame 150 has a checkerboard interleaving frame packing arrangement. Video encoder 28 may provide this SEI message, e.g., by setting the frame_packing_arrangement type value in the SEI message equal to zero.

In accordance with the techniques of this disclosure, encapsulation unit 30 may additionally provide an additional indication at the representation layer that the representation including packed frame 150 includes packed frames having a checkerboard interleaving frame packing arrangement. In this manner, destination device 40 may determine whether to retrieve data from the representation. For example, destination device 40 may determine whether video decoder 48 is capable of decoding packed frames having a checkerboard interleaving frame packing arrangement type. In this manner, destination device 40 may determine whether video decoder 48 is capable of decoding the representation without actually retrieving coded video samples for the representation and attempting to decode the coded video samples using video decoder 48.

FIG. 6 illustrates an example of packed frame 170 having a column interleaving frame packing arrangement. Elements of FIG. 6 conform substantially to their counterparts in FIG. 5. However, packed frame 170 has a different frame packing arrangement. In this example, alternate columns of packed frame 170 correspond to either a left eye view image or a right eye view image, as opposed to the quincunx (checkerboard) sampling of packed frame 150 (FIG. 5). Moreover, the columns of pixels marked with O's in packed frame 170 are not collocated with their counterparts in the right eye view image, but are shifted by one column.

Video encoder 28 may provide a frame packing arrangement SEI message indicating that packed frame 170 has a column interleaving frame packing arrangement. For example, video encoder 28 may set the frame_packing_arrangement_type value of the SEI message equal to 1 and the quincunx_sampling_flag of the SEI message equal to 0. In addition, encapsulation unit 30 may provide information at the representation layer (e.g., in an MPD) indicating that the representation corresponding to packed frame 170 includes packed frames having a column interleaving frame packing arrangement.

FIG. 7 illustrates an example of packed frame 190 having a row interleaving frame packing arrangement. Elements of FIG. 7 conform substantially to their counterparts in FIG. 5. However, packed frame 190 has a different frame packing arrangement. In this example, alternate rows of packed frame 190 correspond to either a left eye view image or a right eye view image. Moreover, the rows of pixels marked with O's in packed frame 190 are not collocated with their counterparts in the right eye view image, but are shifted by one row.

Video encoder 28 may provide a frame packing arrangement SEI message indicating that packed frame 190 has a column interleaving frame packing arrangement. For example, video encoder 28 may set the frame_packing_arrangement_type value of the SEI message equal to 2 and the quincunx_sampling_flag of the SEI message equal to 0. In addition, encapsulation unit 30 may provide information at the representation layer (e.g., in an MPD) indicating that the representation corresponding to packed frame 190 includes packed frames having a row interleaving frame packing arrangement.

FIG. 8 illustrates an example of packed frame 210 having a side-by-side frame packing arrangement. Elements of FIG. 8 conform substantially to their counterparts in FIG. 5. However, packed frame 210 has a different frame packing arrangement. In this example, the leftmost columns of packed frame 210 correspond to alternate columns of a left eye view image, while the rightmost columns of packed frame 210 correspond to alternate columns of a right eye view image.

Video encoder 28 may provide a frame packing arrangement SEI message indicating that packed frame 210 has a side-by-side frame packing arrangement. For example, video encoder 28 may set the frame_packing_arrangement_type value of the SEI message equal to 3 and the quincunx_sampling_flag of the SEI message equal to 0. In addition, encapsulation unit 30 may provide information at the representation layer (e.g., in an MPD) indicating that the representation corresponding to packed frame 210 includes packed frames having a side-by-side frame packing arrangement.

FIG. 9 illustrates an example of packed frame 230 having a top-bottom frame packing arrangement. Elements of FIG. 9 conform substantially to their counterparts in FIG. 5. However, packed frame 170 has a different frame packing arrangement. In this example, topmost rows of packed frame 230 correspond to alternate rows of a left eye view image, while the bottommost rows of packed frame 230 correspond to alternate rows of a right eye view image.

Video encoder 28 may provide a frame packing arrangement SEI message indicating that packed frame 230 has a top-bottom frame packing arrangement. For example, video encoder 28 may set the frame_packing_arrangement_type value of the SEI message equal to 4 and the quincunx_sampling_flag of the SEI message equal to 0. In addition, encapsulation unit 30 may provide information at the representation layer (e.g., in an MPD) indicating that the representation corresponding to packed frame 230 includes packed frames having a top-bottom frame packing arrangement.

FIG. 10 illustrates an example of packed frame 250 having a side-by-side frame packing arrangement with quincunx sampling. Elements of FIG. 10 conform substantially to their counterparts in FIG. 5. However, packed frame 250 has a different frame packing arrangement. In this example, the leftmost columns of packed frame 250 correspond to quincunx (checkerboard) arranged pixels of a left eye view image, while the rightmost columns of packed frame 250 correspond to quincunx (checkerboard) arranged pixels of a right eye view image.

Video encoder 28 may provide a frame packing arrangement SEI message indicating that packed frame 250 has a side-by-side frame packing arrangement with quincunx sampling. For example, video encoder 28 may set the frame_packing_arrangement_type value of the SEI message equal to 3 and the quincunx_sampling_flag of the SEI message equal to 1. In addition, encapsulation unit 30 may provide information at the representation layer (e.g., in an MPD) indicating that the representation corresponding to packed frame 250 includes packed frames having a side-by-side frame packing arrangement with quincunx sampling.

The examples of FIGS. 5-10 are intended as only a small set of sample frame packing arrangements and sampling patterns that can be used when performing the techniques of this disclosure. In general, any possible frame packing arrangement and sampling pattern can be signaled using the techniques of this disclosure. For example, any information contained in a frame packing arrangement SEI message can also be provided as representation layer data, e.g., in the form of an MPD for multimedia content. In some examples, the information indicative of frame packing arrangement and sampling pattern provided in the MPD at the representation layer may be nearly the same or even identical (in terms of syntax and semantics) to the information provided at the codec layer, e.g., the frame packing arrangement SEI message.

Figure 11:
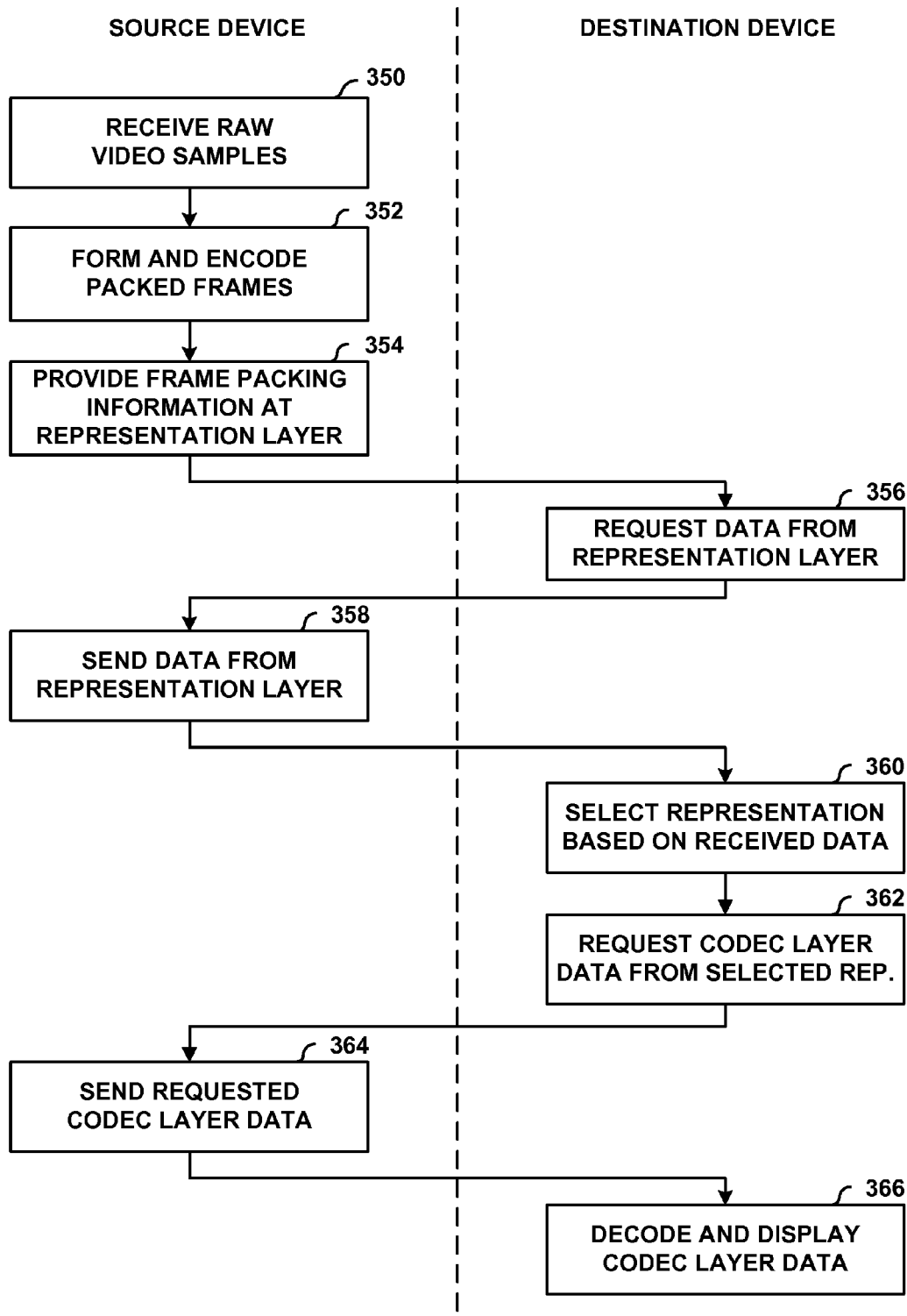
FIG. 11 is a flowchart illustrating an example method for providing information describing packed frames of representations of multimedia content from a source device to a destination device.

FIG. 11 is a flowchart illustrating an example method for providing information describing packed frames of representations of multimedia content from a source device to a destination device. Although described with respect to source device 20 and destination device 40 of FIG. 1, it should be understood that other devices may be configured to perform the techniques of FIG. 11. Moreover, the steps of FIG. 11 may be performed in a different order, and additional or alternative steps may be performed without departing from the techniques of this disclosure.

Initially, source device 20 may receive raw video samples (350). For example, source device 20 may include or be communicatively coupled to two cameras configured to capture two views of a scene substantially simultaneously, such as cameras 82, 84 of FIG. 3. Alternatively, source device 20 may be coupled to a camera that captures one image and may generate a second image, e.g., from depth information. In other examples, source device 20 may include or be communicatively coupled to a computer or other graphical generation unit configured to generate three-dimensional computer graphics, e.g., for video games or computer-rendered cinema. In any case, source device 20 may receive (or in some cases, produce) images from two different views (e.g., a left eye view and a right eye view) of the same scene corresponding to the same temporal instance.

After receiving the raw video samples, source device 20 may form and encode packed frames including one image from each of the two views that form a stereo view pair and that correspond to the same temporal instance (352). That is, for each stereo pair of images (that is, two images from different views forming a stereo pair and corresponding to a common temporal instance), source device 20 may form a packed frame and encode the packed frame. In some examples, source device 20 may form a variety of different packed frames, each having a different frame packing arrangement and corresponding to different representations.

Each packed frame of a representation may have the same frame packing arrangement. Therefore, source device 20 may provide frame packing information at the representation layer for a representation including packed frames (354). As discussed above, in some examples, the representation layer information may comprise a media presentation description data structure. In other examples, source device 20 may generate a similar data structure. In any case, the information may be provided at the representation layer, e.g., a layer of data generally communicated prior to communicating data of the codec layer, that is, the layer intended for a video decoder that includes data for coded video samples. In examples where source device 20 forms packed frames for a variety of different representations all corresponding to the same multimedia content, source device 20 may provide information for each of the representations in the representation layer, e.g., in the MPD data structure.

At some point in the future, destination device 40 may submit a request for data from the representation layer (356) for the multimedia content including the representation. For example, destination device 40 may submit an HTTP HEAD request to the URL including the representation. Destination device 40 may send the request to source device 20 in accordance with a streaming network protocol, e.g., HTTP streaming, and/or in accordance with DASH.

Source device 20 may subsequently receive the request form destination device 40. In response to the request, source device 20 may send the requested data from the representation layer (358). For example, source device 20 may send the MPD data structure to destination device 40. Afterwards, destination device 40 may receive the data, e.g., the MPD data structure.

Destination device 40 may inspect the received data from the representation layer, e.g., the MPD data structure, to select a representation (360). Destination device 40 may include configuration data describing decoding and rendering capabilities of video decoder 48 and video output 44. This information may include, for example, profile and level information supported by video decoder 48 and/or video output 44. Destination device 40 may analyze the received information for one or more representations of the multimedia content that destination device 40 is able to successfully decode and render. Whether the representations include packed frames that can be decoded by video decoder 48 may correspond to one of the analyzed factors. Other factors may include average and/or maximum bitrate for the representation (which may be compared to a currently available bandwidth), required buffer size, frame rate, horizontal and/or vertical resolution, expected macroblock decoding rate, or other such factors.

After selecting a representation that destination device can decode and render, e.g., based on whether the representation includes three-dimensional video content, and if so, packed frames of a frame packing arrangement that video decoder 48 is able to decode, destination device 40 may begin requesting codec layer data from the selected representation (362). In some examples, destination device 40 may submit a request in accordance with a streaming network protocol, such as HTTP streaming or DASH. For example, destination device 40 may submit an HTTP Get or partial Get request that specifies a uniform resource identifier (URI), such as a uniform resource locator (URL) or uniform resource name (URN), of a video fragment, or byte range thereof, of the selected representation.

Source device 20 may then receive the request from destination device 40. In response, source device 20 may send the requested data to destination device 40 (364). This data may also include an additional indication of a frame packing arrangement at the codec layer, which may be intended for video decoding devices such as video decoder 48. For example, source device 20 may provide a frame packing arrangement SEI message at the codec layer, which may be used by video decoder 48 to decode and unpack the packed frame, which destination device 40 may then display (366). However, it should be understood that such information at the codec layer, e.g., the frame packing arrangement SEI message, is distinct and separate from the information provided at the representation layer, e.g., information provided in an MPD data structure or such other data structures. In accordance with the techniques of this disclosure, the frame packing arrangement SEI message may include an indication of an aspect ratio for the views in the frame packed coded video sequence. Alternatively, source device 20 may provide an indication of an aspect ratio for images in the packed frames in a file format layer, in a media file container format, a transport layer such as MPEG-2 Systems TS or PS, HTTP Streaming, or DASH. For example, the indication of aspect ratio maybe signaled for the two views of the requested representation in HTTP streaming, including DASH. Another example is that the indication can be put in the descriptor of the program stream or the transport stream, e.g., of MPEG-2 Systems.

Figure 12:
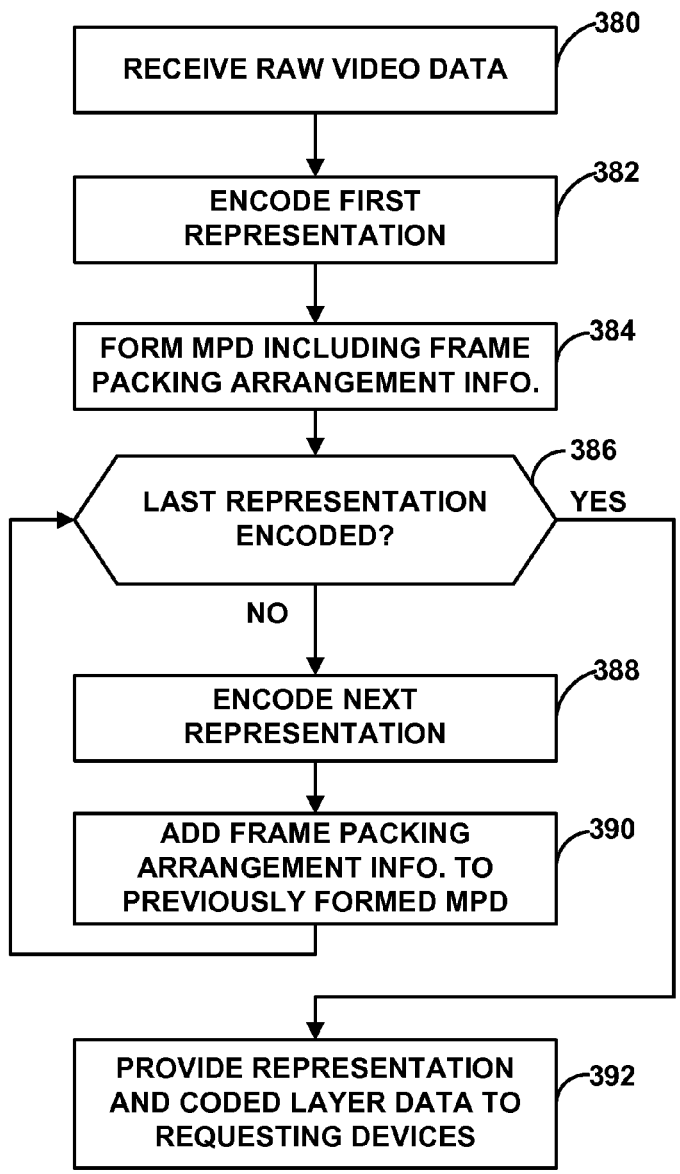
FIG. 12 is a flowchart illustrating an example method for encoding multiple representations of multimedia content and providing information that describes frame packing arrangements for packed frames of the representations.

FIG. 12 is a flowchart illustrating an example method for encoding multiple representations of multimedia content and providing information that describes frame packing arrangements for packed frames of the representations. Although described with respect to source device 20 (FIG. 1) for purposes of example, it should be understood that other devices may perform the method of FIG. 12, and in some cases, two or more devices may perform the method of FIG. 12. For example, one device may be configured to encode video data while another, separate device may be configured to provide representation layer data describing a frame packing arrangement for each of the representations. Moreover, certain steps of the method may be performed in a different order, and additional or alternative steps may be performed, without departing from the techniques of this disclosure.

Initially, source device 20 may receive raw video data (380). As described above, the raw video data may be received from two parallel cameras, one camera and a corresponding image generated from the image captured by the camera and depth information, two computer-generated images, only one image for two-dimensional video data, or other image sources. A full sequence of raw video data may correspond to a multimedia content. Source device 20 may then encode a first representation of the multimedia content (382), e.g., including packed frames of a first frame packing arrangement. Source device 20 may also form a media presentation description (MPD) data structure that includes frame packing arrangement information for the first representation (384).

Source device 20 may then determine whether the previously encoded representation is the last representation to be encoded (386). If more than one representation is to be encoded ("NO" branch of 386), source device 20 may encode the next representation (388), which may include packed frames of a different frame packing arrangement, data for two or more full-resolution views (e.g., MVC data without packed frames), two-dimensional video data, or other types of video data. The other representations may also include other characteristics such as frame rates, bitrates, horizontal and/or vertical resolutions, or other characteristics. Source device 20 may then add frame packing arrangement information, if any, to the MPD for the previously encoded representation (390) and again determine whether the last representation has been encoded (386).

Source device 20 may continue to encode representations and add descriptive data, including frame packing information (if any) to the MPD, until all representations have been encoded. After all representations have been encoded ("YES" branch of 386), source device 20 may provide the representation layer and codec layer data to requesting devices (392). As shown above with respect to FIG. 11, in some examples, a requesting device may first request the representation layer data, e.g., the MPD data structure, to select a representation and to determine how to access data of the selected representation, then request codec layer data from the selected representation.

In this manner, the method of FIG. 12 is an example of a method including receiving a packed frame of video data, wherein the packed frame comprises two frames corresponding to different views of a scene for three-dimensional playback, and providing information at a representation layer to a client device, wherein the information indicates a frame packing arrangement for the packed frame.

Figure 13:
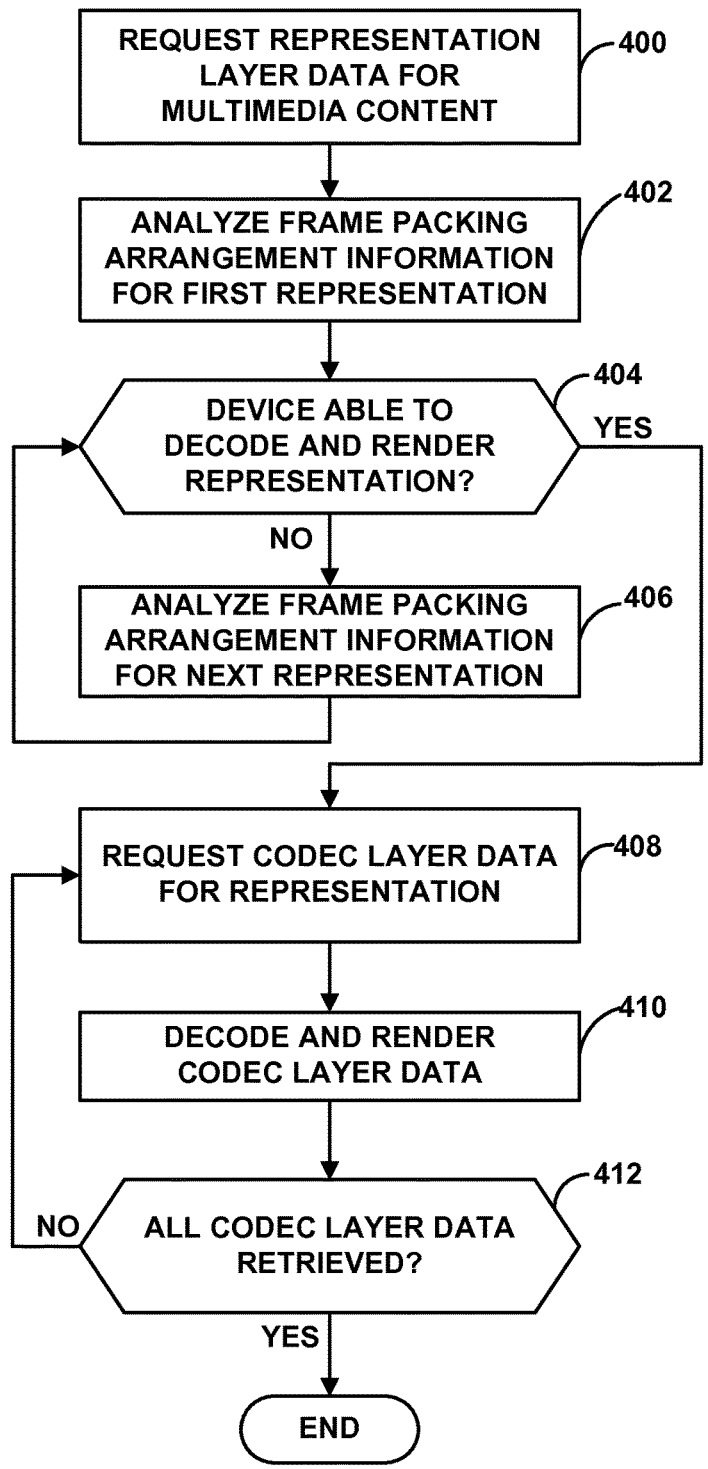
FIG. 13 is a flowchart illustrating an example method for selecting a representation of multimedia content using information that describes frame packing arrangements for packed frames of the representations.

FIG. 13 is a flowchart illustrating an example method for selecting a representation of multimedia content using information that describes frame packing arrangements for packed frames of the representations. Although described with respect to destination device 40 (FIG. 1) for purposes of example, it should be understood that other devices may perform the method of FIG. 13. Moreover, certain steps of the method may be performed in a different order, and additional or alternative steps may be performed, without departing from the techniques of this disclosure.

Initially, destination device 40 may request representation layer data for multimedia content (400). For example, destination device 40 may request an MPD or other data structure describing representations of the multimedia content, which may include frame packing arrangement information for the multimedia content. After receiving the representation layer data, destination device 40 may analyze the representation layer data, including frame packing arrangement information (if any) for the first representation of the multimedia content (402). In particular, destination device 40 may determine whether destination device 40 is able to decode and render the representation, e.g., based on at least the indication of the frame packing arrangement for packed frames of the representation (if any) (404).

If destination device 40 is not able to decode and render the representation ("NO" branch of 404), e.g., because video decoder 48 does not support the frame packing arrangement indicated in the representation layer data, destination device 40 may analyze characteristics, such as frame packing arrangement information, for a next one of the representations (406). Destination device 40 may continue to analyze characteristics of representations of the multimedia content until destination device 40 finds a representation that can be successfully decoded and rendered ("YES" branch of 404). Destination device 40 may select this representation. In some examples, destination device 40 may analyze characteristics of all of the available representations, to find one of the representations having the highest possible quality that can also be successfully retrieved, e.g., based on current network conditions such as available bandwidth, and decoded and rendered by destination device 40.

After selecting a representation, destination device 40 may request codec layer data for the representation (408), e.g., a movie fragment or portion of a movie fragment. The request may correspond to an HTTP Get or partial Get request, in some examples. After receiving the data from the codec layer, destination device 40 may decode and render the codec layer data (410), which may include a frame packing arrangement SEI message separate from the representation layer information indicating the frame packing arrangement for the representation. In accordance with the techniques of this disclosure, the frame packing arrangement SEI message may include an indication of an aspect ratio for each view in the frame packed coded video sequence. Furthermore, in addition or alternatively, destination device 40 may receive an indication of an aspect ratio for images in the packed frames in a file format layer, in a media file container format, a transport layer such as MPEG-2 Systems TS or PS, or attributes of a HTTP Streaming, or DASH representation. Destination device 40 may use the aspect ratio information to determine how to properly upsample and/or downsample the images extracted from the packed frame, e.g., following decoding of the packed frame.

Destination device 40 may check whether all of the codec layer data of the representation has been retrieved (412). If not ("NO" branch of 412), destination device 40 may request a next set of codec layer data (408), which destination device 40 may decode and render (410), and again check whether all codec layer data has been retrieved (412). After all codec layer data has been retrieved ("YES" branch of 412), destination device 40 may stop requesting data from source device 20.

In this manner, the method of FIG. 13 is an example of a method including receiving information indicative of whether a bitstream includes a packed frame of video data, wherein the packed frame comprises two frames corresponding to different views of a scene for three-dimensional playback, and wherein the information is present in a representation layer external to a codec layer of the bitstream, automatically determining, by a processing unit of a device, whether the device is capable of decoding and rendering the bitstream based on an analysis of the received information by the processing unit and decoding and rendering capabilities of the device, and retrieving the bitstream when the processing unit determines that the device is capable of decoding and rendering the bitstream.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of providing video data, the method comprising:
  receiving, by a server device, a packed frame of a representation of a plurality of representations of video data of multimedia content, wherein the packed frame comprises two frames corresponding to different views of a scene for three-dimensional playback, wherein the representations act as alternatives to each other and have different coding or rendering characteristics from each other, wherein each of the representations corresponds to a separate, respective bitstream, and wherein each of the representations includes a respective plurality of segments including coded video data, the segments comprising respective independently retrievable files;
  providing, by the server device, a manifest file to a client device separate from the server device, wherein the manifest file indicates a frame packing arrangement for the packed frame, wherein the manifest file includes descriptive data for each of the representations, and wherein the manifest file is separate from the segments of the representations such that the manifest file does not include any coded video data;

receiving, by the server device, a request from the client device for at least a portion of one of the segments of one of the representations described by the manifest file; and in response to the request, sending, by the server device, at least the portion of the one of the segments to the client device.

2. The method of claim 1, wherein providing the manifest file comprises providing the manifest file in response to a request from the client device for representation layer data.

3. The method of claim 1, wherein providing the manifest file comprises:

forming a media presentation description data structure that describes three-dimensional video characteristics of each of the plurality of representations; and sending the media presentation description data structure to the client device.

4. The method of claim 1, further comprising:

receiving a request for data from a representation of multimedia content, the representation comprising the packed frame, from the client device when the client device is configured to decode packed frames having the frame packing arrangement of the packed frame; and in response to the request, sending the data to the client device.

5. The method of claim 1, further comprising sending information at a codec layer for a representation of multimedia content, the representation comprising the packed frame, to the client device, wherein the information comprises a frame packing arrangement supplemental enhancement information (SEI) message, and wherein the frame packing arrangement SEI message is separate from the manifest file.

6. The method of claim 1, further comprising providing an indication of an aspect sub-sampling ratio for each of the views.

7. The method of claim 6, wherein providing the indication of the aspect sub-sampling ratio comprises including information for the indication in at least one of a codec layer, a file format layer in a media file container format, and a transport layer.

8. The method of claim 7, wherein the transport layer comprises one of MPEG-2 Transport Stream and HTTP streaming.

9. The method of claim 6, wherein the indication of the aspect sub-sampling ratio comprises an indication that the views have an asymmetric spatial resolution.

10. The method of claim 1, wherein providing the manifest file comprises sending the information to the client device in accordance with Dynamic Adaptive Streaming over HTTP (DASH).

11. An apparatus for providing video data, the apparatus comprising a server device comprising:

a memory configured to store video data; and a hardware-based processing unit including logic circuitry, the processing unit configured to: receive a packed frame of a representation of a plurality of representations of the video data, wherein the packed frame comprises two frames corresponding to different views of a scene for three-dimensional playback, wherein the representations act as alternatives to each other and have different coding or rendering characteristics from each other, wherein each of the representations corresponds to a separate, respective bitstream, and wherein each of the representations includes a respective plurality of segments including coded video data, the segments comprising respective independently retrievable files, provide a manifest file to a client device, wherein the manifest file indicates a frame packing arrangement for the packed frame, wherein the manifest file includes descriptive data for each of the representations, and wherein the manifest file is separate from the segments of the representations such that the manifest file does not include any coded video data, receive a request from the client device for at least a portion of one of the segments of one of the representations described by the manifest file, and in response to the request, send at least the portion of the one of the segments to the client device.

12. The apparatus of claim 11, wherein the processing unit is configured to provide the manifest file in response to a request from the client device for the manifest file.

13. The apparatus of claim 11, wherein to provide the manifest file, the processing unit is configured to form a media presentation description data structure that describes three-dimensional video characteristics of each of the plurality of representations, and send the media presentation description data structure to the client device.

14. The apparatus of claim 11, wherein the processing unit is further configured to receive a request for data from a representation of multimedia content, the representation comprising the packed frame, from the client device when the client device is configured to decode packed frames having the frame packing arrangement of the packed frame, and, in response to the request, send the data to the client device.

15. The apparatus of claim 11, wherein the processing unit is configured to send information at a codec layer for a representation of multimedia content, the representation comprising the packed frame, to the client device, wherein the information comprises a frame packing arrangement supplemental enhancement information (SEI) message, and wherein the frame packing arrangement SEI message is separate from the manifest file.

16. The apparatus of claim 11, wherein the apparatus comprises at least one of:

an integrated circuit;

a microprocessor; and a wireless communication device that includes the processing unit.

17. An apparatus for providing video data, the apparatus comprising a server device comprising:

means for receiving a packed frame of a representation of a plurality of representations of video data of multimedia content, wherein the packed frame comprises two frames corresponding to different views of a scene for three-dimensional playback, wherein the representations act as alternatives to each other and have different coding or rendering characteristics from each other, wherein each of the representations corresponds to a separate, respective bitstream, and wherein each of the representations includes a respective plurality of segments including coded video data, the segments comprising respective independently retrievable files;

means for providing a manifest file to a client device separate from the server device, wherein the manifest file indicates a frame packing arrangement for the packed frame, wherein the manifest file includes descriptive data for each of the representations, and wherein the manifest file is separate from the segments of the representations such that the manifest file does not include any coded video data;

means for receiving a request from the client device for at least a portion of one of the segments of one of the representations described by the manifest file; and means for sending at least the portion of the one of the segments to the client device in response to the request.

18. The apparatus of claim 17, wherein the means for providing the manifest file comprises means for providing the manifest file in response to a request from the client device for representation layer data.

19. The apparatus of claim 17, wherein the means for providing the manifest file comprises:

means for forming a media presentation description data structure that describes three-dimensional video characteristics of each of the plurality of representations; and means for sending the media presentation description data structure to the client device.

20. The apparatus of claim 17, further comprising:

means for receiving a request for data from a representation of multimedia content, the representation comprising the packed frame, from the client device when the client device is configured to decode packed frames having the frame packing arrangement of the packed frame; and means for sending the data to the client device in response to the request.

21. The apparatus of claim 17, further comprising means for sending information at a codec layer for a representation of multimedia content, the representation comprising the packed frame, to the client device, wherein the information comprises a frame packing arrangement supplemental enhancement information (SEI) message, and wherein the frame packing arrangement SEI message is separate from the manifest file.

22. A computer program product comprising a non-transitory computer-readable storage medium having stored thereon instructions that, when executed, cause a processor of a server device for providing video data to:

receive a packed frame of a representation of a plurality of representations of video data of multimedia content, wherein the packed frame comprises two frames corresponding to different views of a scene for three-dimensional playback, wherein the representations act as alternatives to each other and have different coding or rendering characteristics from each other, wherein each of the representations corresponds to a separate, respective bitstream, and wherein each of the representations includes a respective plurality of segments including coded video data, the segments comprising respective independently retrievable files;

provide a manifest file to a client device separate from the server device, wherein the manifest file indicates a frame packing arrangement for the packed frame, wherein the manifest file includes descriptive data for each of the representations, and wherein the manifest file is separate from the segments of the representations such that the manifest file does not include any coded video data;

receive a request from the client device for at least a portion of one of the segments of one of the representations described by the manifest file; and in response to the request, send at least the portion of the one of the segments to the client device.

23. The computer program product of claim 22, wherein the instructions that cause the processor to provide the manifest file comprise instructions that cause the processor to provide the manifest file in response to a request from the client device for representation layer data.

24. The computer program product of claim 22, wherein the instructions that cause the processor to provide the manifest file comprise instructions that cause the processor to:

form a media presentation description data structure that describes three-dimensional video characteristics of each of the plurality of representations; and send the media presentation description data structure to the client device.

25. The computer program product of claim 22, further comprising instructions that cause the processor to:

receive a request for data from a representation of multimedia content, the representation comprising the packed frame, from the client device when the client device is configured to decode packed frames having the frame packing arrangement of the packed frame; and in response to the request, send the data to the client device.

26. The computer program product of claim 22, further comprising instructions that cause the processor to send information at a codec layer for a representation of multimedia content, the representation comprising the packed frame, to the client device, wherein the information comprises a frame packing arrangement supplemental enhancement information (SEI) message, and wherein the frame packing arrangement SEI message is separate from the manifest file provided at the representation layer.

* * * * *